United States Patent
Yamada

(10) Patent No.: US 7,781,130 B2
(45) Date of Patent: Aug. 24, 2010

(54) PIGMENT-CONTAINING HEAT-CURABLE COMPOSITION, COLOR FILTER, IMAGE-RECORDING MATERIAL, AND METHOD OF PRODUCING COLOR FILTER

(75) Inventor: Toru Yamada, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 1115 days.

(21) Appl. No.: 11/446,396

(22) Filed: Jun. 5, 2006

(65) Prior Publication Data

US 2006/0275676 A1 Dec. 7, 2006

(30) Foreign Application Priority Data

Jun. 3, 2005 (JP) ............................. 2005-164840
Jun. 14, 2005 (JP) ............................. 2005-173750

(51) Int. Cl.
*G02B 5/20* (2006.01)

(52) U.S. Cl. .......................................... 430/7

(58) Field of Classification Search ........................ None
See application file for complete search history.

(56) References Cited

U.S. PATENT DOCUMENTS 5,321,249 A * 6/1994 Nomura ................... 250/208.1
5,756,239 A * 5/1998 Wake ............................ 430/7

FOREIGN PATENT DOCUMENTS

| JP | 55-146406 A | 11/1980 |
| JP | 2-181704 A | 7/1990 |
| JP | 2-199403 A | 8/1990 |
| JP | 5273411 A | 10/1993 |
| JP | 6-75375 A | 3/1994 |
| JP | 7-140654 A | 6/1995 |

* cited by examiner

Primary Examiner—John A. McPherson
(74) Attorney, Agent, or Firm—Sughrue Mion, PLLC

(57) ABSTRACT

The invention provides a pigment-containing heat-curable composition including a pigment dispersion solution obtained by dispersing a composition containing a heat-curable resin, a solvent, and a pigment, wherein the concentration of the pigment is 50% or more and less than 100% with respect to the total solid contents.

8 Claims, No Drawings

PIGMENT-CONTAINING HEAT-CURABLE COMPOSITION, COLOR FILTER, IMAGE-RECORDING MATERIAL, AND METHOD OF PRODUCING COLOR FILTER

CROSS-REFERENCE TO RELATED APPLICATION

This application claims priority under 35 USC 119 from Japanese Patent Application Nos. 2005-164840 and 2005-173750 the disclosures of which are incorporated by reference herein.

BACKGROUND OF THE INVENTION

1. Field of the Invention

The present invention relates to a pigment-containing heat-curable composition favorable for forming a colored image on the color filters for use in liquid crystal display devices (LCD's), solid-state imaging devices (CCD, CMOS, and others), and others, a color filter and an image-recording material using the pigment-containing heat-curable composition, and a method of producing the color filter by forming a pattern by dry etching.

2. Description of the Related Art

As methods for producing a color filter for use with a liquid crystal display device or a solid image pickup element, a dyeing methods, a printing methods, an electrodeposition methods, and a pigment dispersion methods are known.

In the pigment dispersion method, the color filter is produced by a photolithographic method using a colored radiation-sensitive composition prepared by dispersing a pigment in any one of various types of photosensitive compositions. The color filter produced by this method is stable with respect to light, heat and the like since the pigment is used. A high positional accuracy can be obtained in this method since patterning is performed by the photolithographic method and, accordingly, this method has widely been used as a method suitable for producing the color filter for a large screen and high fineness color display.

In a case in which the color filter is produced by the pigment dispersion method, the radiation-sensitive composition is first coated on a glass substrate by using, for example, a spin coater or a roll coater and, then, dried, to thereby form a coating film. Then, colored pixels are obtained by pattern-exposing and developing the thus-formed coating film. The color filter can be obtained by repeating such operation as described above by the number of different colors.

As for the pigment dispersion method, a method which uses a negative-type photosensitive composition using an alkali-soluble resin together with a photopolymerizable monomer and a photopolymerization initiator is proposed in each of, for example, JP-A Nos. 2-181704, 2-199403, 5-273411 and 7-140654.

In the increasing need for high-resolution of the color filter for solid-state imaging devices, a method of using a dye was proposed recently (for example, Japanese Patent Application Laid-Open (JP-A) No. 6-75375). However, such dye-containing heat-curable compositions had problems, for example, that they are normally inferior to those containing pigment in various properties such as light fastness, heat resistance, solubility, and coating uniformity. In addition, preparation of the color filter for solid-state imaging devices, which demand a film thickness of 1.5 μm or less and thus, addition of a colorant to the heat-curable composition in a greater amount, often caused a problem of extremely lower patterning efficiency because of insufficient adhesion to the substrate, insufficient hardening, and disappearance of the dye in the exposed portion.

Alternatively, the color filters by photolithography, which contains components other than the colorant such as binder resin, photopolymerizable compound, and initiator in some amounts, have a disadvantage of prohibiting reduction in the film thickness, independently of whether the colorant is a pigment or dye. However, there exists a strong demand recently for reduction in the thickness of color filter, for improvement in the image quality by reduction in shading.

In production of the photolithographic color filters, dry etching methods have been known as the methods effective in forming a thinner film suitable for forming a fine pattern. The dry etching methods, which have been used as the methods of forming a pattern on a colorant-deposited thin film (see, for example, JP-A No. 55-146406), allow production of a color filter having a film thickness of ½ or less of that of the photolithographic color filter, while the spectroscopic characteristics are preserved at the same level.

However, production of thin film by vapor deposition is always accompanied by contamination of the vapor deposition apparatus, which put a heavy load on production of color filter. In addition, the pattern formed is lower in adhesiveness to the lower flat film or the upper film because the pixels are formed only with a pigment or dye, which is also a reason for its low yield.

SUMMARY OF THE INVENTION

The present invention has been made in view of the above circumstances and provide following inventions.

A first aspect of the present invention is a pigment-containing heat-curable composition, including; a pigment dispersion solution obtained by dispersing a composition containing a heat-curable resin, a solvent, and a pigment, wherein the concentration of the pigment is 50% or more and less than 100% with respect to the total solid contents.

A second aspect of the present invention is a color filter, prepared by using the pigment-containing heat-curable composition of the present invention.

A third aspect of the present invention is an image-recording material, including a color layer prepared by using the pigment-containing heat-curable composition of the present invention and a photosensitive resin layer laminated thereon.

A forth aspect of the present invention is a method of producing a color filter by using the image-recording material of the present invention, including; at least forming a pattern image on the photosensitive resin layer of the image-recording material, dry-etching the image-recording material to form a pattern in the color layer of the image-recording material.

A fifth aspect of the present invention is a method of producing a color filter, including; forming a color layer by coating and drying a colorant-containing heat-curable composition containing a colorant and a heat-curable compound and having a colorant concentration of 50% by mass or more and less than 100% by mass with respect to the total solid contents on a substrate; heat-curing the color layer; forming an image-recording material by coating and drying a photosensitive resin composition on the color layer and thus forming the photosensitive resin layer on the heat-cured color layer; forming a pattern formed on the photosensitive resin layer by image wise exposing the photosensitive resin layer to light and developing the photosensitive resin layer; and forming a pattern in the color layer by dry-etching the image-recording material having the pattern formed on the photosensitive resin layer.

A sixth aspect of the present invention is a color filter, prepared by the method of producing a color filter of the present invention.

A seventh aspect of the present invention is an image-recording material for use in the method of producing a color filter of the present invention, including a color layer prepared by using the colorant-containing heat-curable composition and a photosensitive resin layer laminated thereon.

DETAILED DESCRIPTION OF THE INVENTION

Hereinafter, the pigment-containing heat-curable composition according to the invention, the color filter and the image-recording material using the pigment-containing heat-curable composition according to the present invention, and the method of producing the color filter will be described in detail.

A first invention is a pigment-containing heat-curable composition, including a pigment dispersion solution obtained by dispersing a composition containing a heat-curable resin, a solvent, and a pigment, wherein the concentration of the pigment is 50% or more and less than 100% with respect to the total solid contents.

The first invention can provide a pigment-containing heat-curable composition suitable for etching, superior in spectroscopic characteristics, squareness in pattern shape and adhesiveness to the lower and upper layers, allowing reduction in film thickness, and containing a smaller amount of resin and a higher concentration of pigment. In addition, the pigment-containing heat-curable composition according to the first invention can be used in preparation of a color filter and an image-recording material. The first invention can provide a method of producing a superior color filter by using the pigment-containing heat-curable composition and by using a dry etching method higher in performance per cost.

The color filter preparation of according to a second invention is a method of producing a color filter, comprising;

forming a color layer by coating and drying a colorant-containing heat-curable composition containing a colorant and a heat-curable compound and having a colorant concentration of 50% by mass or more and less than 100% by mass with respect to the total solid contents on a substrate;

heat-curing the color layer;

forming an image-recording material by coating and drying a photosensitive resin composition on the color layer and thus forming the photosensitive resin layer on the heat-cured color layer;

forming a pattern formed on the photosensitive resin layer by image wise exposing the photosensitive resin layer to light and developing the photosensitive resin layer; and forming a pattern in the color layer by dry-etching the image-recording material having the pattern formed on the photosensitive resin layer.

The second invention allows production of a color filter superior in spectroscopic characteristics and squareness of pattern shape by using the colorant-containing heat-curable composition favorable for etching, superior in adhesiveness to the lower and upper layers, and allowing reduction in film thickness.

Pigment-Containing Heat-Curable Composition According to the First Invention

The pigment-containing heat-curable composition according to the invention includes a pigment dispersion solution obtained by dispersing a composition containing a heat-curable resin, a solvent, and a pigment, wherein the concentration of the pigment is 50% or more and less than 100% with respect to the total solid contents. That is, it is possible to obtain a higher-concentration pigment dispersion solution and form a thinner film with the higher-concentration pigment dispersion solution, by making the resin for dispersion heat-curable and thus reducing the content of the compounds other than the pigment in the pigment-containing heat-curable composition according to the invention. The pigment-containing heat-curable composition according to the invention may contain, as needed, a heat-curable compound and other additives additionally.

-Pigment Dispersion Solution-

The pigment dispersion solution according to the invention is prepared by dispersing a composition containing a heat-curable resin, a solvent, and a pigment.

<Heat-Curable Resin>

In the invention, the heat-curable resin is used for dispersing a pigment in production of the pigment dispersion solution.

The heat-curable resin for use in the invention is not particularly limited, if it gives a hardened film in reaction, and examples thereof include phenol resins such as novolak resin; amino resins such as urea resin, melamine resin, and benzoguanamine resin; allyl resins such as unsaturated polyester resin and diallyl phthalate resin; epoxy resins such as alkyd resin, bisphenol A epoxy resin, novolak epoxy resin, polyfunctional-group epoxy resin, and alicyclic epoxy resin; urethane resins; silicon resins; and the like. In addition, resins containing a functional group such as epoxy, methylol, alkoxymethyl and acyloxymethyl group may also be used properly. Among them, epoxy group-containing resins having an epoxy group are preferable and multifunctional epoxy group-containing resins are particularly preferable.

The resin having epoxy groups may be any compound that has an epoxy group and crosslinking property, and examples thereof include a divalent glycidyl group-containing low molecular weight compound, such as bisphenol A diglycidyl ether, ethylene glycol diglycidyl ether, butanediol diglycidyl ether, hexanediol diglycidyl ether, dihydroxybiphenyl diglycidyl ether, diglycidyl phthalate and N,N-diglycidylaniline, a trivalent glycidyl group-containing low molecular weight compound, such as trimethylolpropane triglycidyl ether, trimethylolphenol triglycidyl ether and Tris P-PA (trisphenol P-PA) triglycidyl ether, a tetravalent glycidyl group-containing low molecular weight compound, such as pentaerythritol tetraglycidyl ether and tetramethylolbisphenol A tetraglycidyl ether, a polyvalent glycidyl group-containing low molecular weight compound, such as dipentaerythritol pentaglycidyl ether and dipentaerythritol hexaglycidyl ether, and a glycidyl group-containing polymer compound, such as polyglycidyl (meth)acrylate and a 1,2-epoxy-4-(2-oxiranyl) cyclohexane adduct of 2,2-bis(hydroxymethyl)-1-butanol.

Commercially available products thereof include an alicyclic epoxy compound "CEL-2021", an alicyclic solid epoxy resin "EHPE-3150", an epoxidized polybutadiene "PB3600", a flexible alicyclic epoxy compound "CEL-2081", and a lactone-modified epoxy resin "PCL-G" (respectively, manufactured by Daicel Chemical Industries, Ltd.), and the like. Other examples include "Celoxide 2000", "Epolead GT-3000", and "GT-4000" (respectively, manufactured by Daicel Chemical Industries, Ltd.). Among them, alicyclic epoxy resins are superior in hardening efficiency, and "EHPE-3150" is most superior in hardening efficiency. These compounds may be used alone, in combination of two or more, or in combination with another resin described below.

The content of the heat-curable resin in the pigment-containing heat-curable composition according to the invention may vary according to the kind of the resin, but is preferably 35% by mass or less, more preferably 0.1 to 25% by mass, and particularly preferably 1 to 20% by mass.

The total content of the heat-curable resin and the heat-curable compound described below in the pigment-containing heat-curable composition according to the invention may vary according to the kind of the compound used, but is preferably 70% by mass or less, more preferably 0.2 to 50% by mass, and particularly preferably, 1 to 30% by mass, with respect to the total solid contents (mass) in the pigment-containing heat-curable composition according to the invention.

The heat-curable resin may be used as a dispersing resin during dispersion of the pigment, but is sometimes, poor in dispersing capacity. Accordingly, a resin obtained by copolymerization of a compound having a heat-curable functional group and a binder shown below, which has been commonly used as a dispersion binder, is favorably used, because the resin is superior in dispersing capacity.

<Binder>

The binder for use in dispersing may be alkali-insoluble, but should be soluble in organic solvents.

The binder is preferably a linear organic high-molecular weight polymer soluble in organic solvents. Examples of the linear organic high-molecular weight polymers include polymers having a carboxylic acid group on the side chain such as the methacrylate copolymers, acrylate copolymers, itaconate copolymers, crotonate copolymers, maleate copolymers, partially-esterified maleate copolymers described in JP-A No. 59-44615, Japanese Patent Application Publication (JP-B) Nos. 54-34327, 58-12577, and 54-25957, JP-A Nos. 59-53836 and 59-71048, and others; as well as acidic cellulose derivatives similarly having a carboxylic acid group on the side chain.

In addition to the foregoing, a polymer obtained by adding an acid anhydride to a polymer having a hydroxyl group, a polyhydroxystyrene resin, a polysiloxane resin, poly(2-hydroxyethyl(meth)acrylate), polyvinylpyrrolidone, polyethyleneoxide and polyvinyl alcohol are also useful.

A monomer having a hydrophilic group may be copolymerized, and examples thereof include alkoxyalkyl(meth)acrylate, hydroxyalkyl(meth)acrylate, glycerol (meth)acrylate, (meth)acrylamide, N-methylolacrylamide, secondary or tertiary alkylacrylamide, dialkylaminoalkyl(meth)acrylate, morpholine (meth)acrylate, N-vinylpyrrolidone, N-vinylcaprolactam, vinylimidazole, vinyltriazole, methyl (meth)acrylate, ethyl(meth)acrylate, branched or linear propyl(meth)acrylate, branched or linear butyl(meth)acrylate and phenoxyhydroxypropyl(meth)acrylate.

Among these various kinds of binders, a polyhydroxystyrene resin, a polysiloxane resin, an acrylic resin, an acrylamide resin and an acrylic/acrylamide copolymer resin are preferred from the standpoint of heat resistance, and an acrylic resin, an acrylamide resin and an acrylic/acrylamide copolymer resin are preferred from the standpoint of controllability of developing property.

Favorable examples of the acrylic resins include copolymers selected from a monomer selected from benzyl(meth)acrylate, (meth)acrylic acid, hydroxyethyl (meth)acrylate, (meta)acrylamide, and the like, including copolymers such as benzyl methacrylate/methacrylic acid, and benzyl methacrylate/benzyl methacrylamide, KS resist-106 (manufactured by Osaka Organic Chemical Industry Ltd.), Cyclomer P series products (Daicel Chemical Industries, Ltd.).

It is possible to improve the adhesiveness, for example to the lower layer, and the properties of the coated surface during spin coating or slit coating, by dispersing the colorant in the binder at higher concentration.

The weight-average molecular weight of the binder (the value on the basis of polystyrene measured by GPC method) is preferably 1,000 to $2\times10^5$, more preferably 2,000 to $1\times10^5$, and particularly preferably 5,000 to $5\times10^4$.

The heat-curable resin according to the invention functions not only as a dispersing resin but also as a heat-curable resin. Thus, the heat-curable resin is not particularly limited, if it is a heat-curable compound having a binder function to some degree, and the binders described above having a heat-curing function may be used as they are. As described above, the heat-curable resin according to the invention is preferably a binder having epoxy groups therein, and among them, the acrylic resins copolymerized, for example, with glycidyl (meth)acrylate are preferable.

Examples of the copolymers include benzyl methacrylate/glycidyl methacrylate copolymers, hydroxyethyl methacrylate/benzyl methacrylate/glycidyl methacrylate copolymers, benzyl methacrylate/hydroxyethyl methacrylate/glycidyl methacrylate/isobutyl methacrylate copolymers, and the copolymers thereof in combination with another monomer according to application. The copolymerization ratio, the molecular weight, and others of the resins above are arbitrarily selected.

It is possible to improve the adhesiveness, for example, with the lower layer when a film is formed and the properties of the coated surface during spin coating or slit coating, by dispersing the pigment in the heat-curable resin at higher concentration.

The content of the binder in the heat-curable composition is preferably 0.01 to 90% by mass, more preferably 0.1 to 80% by mass, and particularly preferably 0.5 to 70% by mass, with respect to the total solid contents (mass) in the composition.

<Pigment>

Any one of known various inorganic or organic pigments may be used as the pigment according to the invention. The pigment according to the invention is preferably finer in shape, whether it is inorganic or organic. Considering the handling efficiency, the average particle diameter of the pigment particles is preferably 0.001 to 0.1 µm, and more preferably 0.005 to 0.05 µm. In the pigment according to the invention, pigment particles having a particle diameter in the range of 0.01±0.005 µm are particularly preferably contained in an amount of 75% by mass or more with respect to the total mass of the pigment particles. It is particularly preferable to disperse the pigment by the dispersion method described below, to obtain such a particle-diameter distribution.

Examples of the inorganic pigments include metal compounds such as metal oxides and metal complex salts, and specific examples thereof include metal oxides such as of aluminum, iron, cobalt, cadmium, lead, copper, titanium, magnesium, chromium, zinc, and antimony, and the mixed metal oxides thereof.

Examples of the organic pigment include C.I.Pigment Yellow 11, 24, 31, 53, 83, 93, 99, 108, 109, 110, 138, 139, 147, 150, 151, 154, 155, 167, 180, 185, 199;

C.I.Pigment Orange 36, 38, 43, 71;

C.I.Pigment Red 81, 105, 122, 149, 150, 155, 171, 175, 176, 177, 209, 220, 224, 242, 254, 255, 264, 270;

C.I.Pigment Violet 19, 23, 32, 39;

C.I.Pigment Blue 1, 2, 15, 15:1, 15:3, 15:6, 16, 22, 60, 66;
C.I.Pigment Green 7, 36, 37;
C.I.Pigment Brown 25, 28;

Examples of the organic pigments favorably used in the invention include, but are not limited to, the following pigments.
C.I.Pigment Yellow 11, 24, 108, 109, 110, 138, 139, 150, 151, 154, 167, 180, 185;
C.I.Pigment Orange 36, 71;
C.I.Pigment Red 122, 150, 171, 175, 177, 209, 224, 242, 254, 255, 264;
C.I.Pigment Violet 19, 23, 32;
C.I.Pigment Blue 15:1, 15:3, 15:6, 16, 22, 60, 66;

The organic pigments may be used alone or in combination of two or more for improvement in color purity. Specific examples thereof are as follows: examples of the red pigments include anthraquinone pigments, perylene pigments, or diketopyrrolopyrrole pigments. Further examples of the red pigments includes the mixtures containing at least one of the aforementioned red pigments and disazo yellow pigments, isoindoline yellow pigments, quinophtharone yellow pigments or a perylene red pigment, and the like. Examples of the anthraquinone pigments include C.I. Pigment Red 177; examples of the perylene pigments include C.I. Pigment Red 155 and C.I. Pigment Red 224; examples of the diketopyrrolopyrrole pigments include C.I. Pigment Red 254; and the combination thereof of C.I. Pigment Yellow 83 or C.I. Pigment Yellow 139 is preferable from the point of color reproducibility. The mass ratio of the red pigment to the yellow pigment is preferably 100:5 to 100:50 and more preferably 100:10 to 100:30. At a mass ratio in the range above, it is possible to suppress increase of light transmittance and improve color purity, and also, to prevent the deviation from the desirable NTSC tone by shift of the main wavelength to lower wavelength. It is possible to adjust the ratio according to the desirable chromaticity, when red pigments are used in combination.

Examples of the green pigments include halogenated phthalocyanine pigments, or the combinations thereof with a disazo yellow pigment, quinophtharone yellow pigment, azomethine yellow pigment or isoindoline yellow pigment. For example, a combination of a C.I. Pigment green 7, 36, or 37 with C.I. Pigment Yellow 83, C.I. Pigment Yellow 138, C.I. Pigment Yellow 139, C.I. Pigment Yellow 150, C.I. Pigment Yellow 180 or C.I. Pigment Yellow 185 is preferable. The mass ratio of the green pigment to the yellow pigment is preferably 100:5 to 100:150 and more preferably, 100:30 to 100:120. At a mass ratio in the range above, it is possible to suppress increase of light transmittance at a wavelength of 400 nm to 450 nm and improve color purity, and to prevent the deviation from the desirable NTSC tone by shift of the main wavelength to lower wavelength.

Examples of the blue pigments include phthalocyanine pigments, or the combination thereof with a dioxazine purple pigment. The combination is preferably C.I. Pigment blue 15:6 and C.I. Pigment Violet 23. The mass ratio of the blue pigment to the purple pigment is preferably 100:0 to 100:30 and more preferably 100:10 or less.

In addition, it is possible to obtain a pigment-containing photosensitive resin favorable in dispersion efficiency and stability, by using a powdery processed pigment, i.e., a pigment finely dispersed in an acrylic resin, maleate resin, vinyl chloride-vinyl acetate copolymer, ethylcellulose resin, or the like.

As described above, the pigment-containing heat-curable composition according to the invention is preferably prepared by using a pigment having a sharp particle-diameter distribution prepared by pulverizing the pigment particles into fine particles. Specifically, preferable is use of a pigment having an average particle diameter of approximately 0.01 μm and containing particles having a particle diameter in the range of 0.01±0.005 μm in an amount of 75% by mass or more. The method of dispersing the pigment is particularly important, in adjusting the pigment particle-diameter distribution in the range above. The method of dispersing the pigment will be described below.

In the invention, processed pigments previously treated with an acrylic resin, vinyl chloride-vinyl acetate resin, maleate resin, ethylcellulose resin, nitrocellulose resin, or the like are favorably used. In the invention, the shape of the processed pigment previously treated with the resin above is preferably powder, paste, or pellet, in which the resin and the pigment are dispersed uniformly.

<Pigment Concentration>

The concentration of the pigment in the pigment dispersion solution is preferably adjusted to 50% by mass or more and less than 100% by mass with respect to the total solid contents in the pigment-containing heat-curable composition according to the invention. The pigment concentration with respect to the total solid contents in the pigment-containing heat-curable composition according to the invention is more preferably 60% by mass or more and 95% by mass or less and particularly preferably 65% by mass or more and 90% by mass or less. When the pigment content is less than 50% by mass, it is not possible to obtain desired spectroscopic characteristics and the resulting composition is lower in color reproduction and unfavorable in gray balance. The range above is favorable, because the composition has favorable hardening efficiency.

The content of the pigment dispersion solution according to the invention in the pigment-containing heat-curable composition according to the invention is also decided according to the pigment concentration.

The color filter prepared with the pigment-containing heat-curable composition according to the invention has spectroscopic characteristics almost equivalent to those prepared by photolithography, and yet allows reduction in film thickness.

Normally, in the case of photolithography, it is necessary to increase the solid content concentration in the coated film, to prepare a thin film. It is also needed to increase the concentration of the pigment, to obtain desirable spectroscopic characteristics.

Therefore, production of a thin film having desired spectroscopic characteristics by photolithography leads to decrease in the amount of solid contents other than the pigment, consequently causing hardening defects and the disappearance of the pattern associated therewith during alkali development (disappearance in the development or rinsing process). Thus, there was limitation in pigment concentration during production of thin film by photolithography, and it was practically impossible to form a pattern at a pigment concentration of 65% by mass or more.

In contrast, the color filter according to the invention prepared by using the pigment-containing heat-curable composition according to the invention, on which a pattern is formed by dry etching while the pigment-containing coated film (color layer) is hardened by heat as described below, it is not necessary to add a monomer (photopolymerizable compound) and a photopolymerization initiator, which are essential components in the photolithographic method, to the pigment-containing layer. Thus, it is possible to raise the pigment concentration to 65% by mass or more in the pigment-containing heat-curable composition according to the invention, because it contains at least a pigment and a heat-curable resin.

The ultimate pigment concentration is 100% by mass by vapor deposition, and the film thickness can be reduced to the lowest by the vapor deposition method, but as described above, there are (1) a problem of apparatus contamination and occasionally (2) a problem in the adhesiveness to the upper or lower layer in vapor deposition.

The method of forming a thin film by coating and curing a heat-curable composition at high pigment concentration by spin coater or slit coating gives a film slightly thicker, to a degree corresponding to the amounts of the heat-curable resin and others added, than that by the vapor deposition method, but eliminates the need for an alkali developing efficiency and thus, allows preparation of a curing solution at a higher pigment concentration that was not possible by the photolithographic method.

It is possible to obtain a thin film having a desirable film thickness described below at a pigment concentration of 65% mass or more in the pigment-containing heat-curable composition according to the invention, but, for example when a heat-curing system using an epoxy resin described below is used, the pigment concentration may be raised further to 70% by mass or more. Accordingly, it is possible to form a film thinner than the ultimate lowest thickness possible by the photolithographic method, almost without any change in spectroscopic characteristics.

In addition, it is also possible to obtain an adhesiveness that was not possible by vapor deposition at high pigment concentration, by making the components other than the pigment easily adhesive.

(Dye)

The pigment-containing heat-curable composition according to the invention may contain a dye as well as a pigment. The dye is not particularly limited, and examples thereof include dyes known for use in color filters, and the like. Specific examples thereof include the colorants described in JP-A Nos. 64-90403, 64-91102, 1-94301, and 6-11614, Japanese Patent 2592207, U.S. Pat. Nos. 4,808,501, 5,667,920, and 5,059,500, JP-A Nos. 5-333207, 6-35183, 6-51115, and 6-194828, and others. Specific examples thereof, as seen from the chemical structure, include triphenylmethane dyes, anthraquinone dyes, benzylidene dyes, oxonol dyes, cyanine dyes, phenothiazine dyes, pyrrolopyrazole azomethine dyes, xanthene dyes, phthalocyanine dyes, benzopyran dyes, indigo dyes, and the like; and particularly preferable are pyrazole azo dyes, anilino azo dyes, pyrazolotriazole azo dyes, pyridone azo dyes, anthraquinone dyes, and anthrapyridone dyes.

When the composition is used in a resist system of developing it in water or an alkaline solution, an acidic dye and/or the derivative thereof are favorably used, for complete removal of the binder and/or the dye by development. In addition, any one of direct dyes, basic dyes, mordant dyes, acidic mordant dyes, azoic dyes, disperse dyes, oil-soluble dyes, food dyes, and/or the derivatives thereof, and the like may be used effectively.

-Acid Dye-

The acid dye will be described below. The acid dye is not particularly restricted, so long as it is a dye having an acidic group of, for example, a sulfonic acid or a carboxylic acid, or a phenolic hydroxyl group. However, it is preferable to select the acid dye by taking into consideration all of required properties, such as solubility against an organic solvent or a developer, formability of a salt with a basic compound, light absorbance, an interaction with any one of other components in the curable composition, light fastness and heat resistance.

Although specific examples of such acid dyes are described below, the invention is not restricted to these examples. Examples of the acid dyes include:

Acid alizarin violet N;

Acid black 1, 2, 24, 48;

Acid blue 1, 7, 9, 15, 18, 23, 25, 27, 29, 40, 42, 45, 51, 62, 70, 74, 80, 83, 86, 87, 90, 92, 96, 103, 112, 113, 120, 129, 138, 147, 150, 158, 171, 182, 192, 210, 242, 243, 256, 259, 267, 278, 280, 285, 290, 296, 315, 324:1, 335, 340;

Acid chrome violet K;

Acid Fuchsin;

Acid green 1, 3, 5, 9, 16, 25, 27, 50, 58, 63, 65, 80, 104, 105, 106, 109;

Acid orange 6, 7, 8, 10, 12, 26, 50, 51, 52, 56, 62, 63, 64, 74, 75, 94, 95, 107, 108, 169, 173;

Acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 182, 183, 198, 206, 211, 215, 216, 217, 227, 228, 249, 252, 257, 258, 260, 261, 266, 268, 270, 274, 277, 280, 281, 195, 308, 312, 315, 316, 339, 341, 345, 346, 349, 382, 383, 394, 401, 412, 417, 418, 422, 426;

Acid violet 6B ,7, 9, 17, 19;

Acid yellow 1, 3, 7, 9, 11, 17, 23, 25, 29, 34, 36, 38, 40, 42, 54, 65, 72, 73, 76, 79, 98, 99, 111, 112, 113, 114, 116, 119, 123, 128, 134, 135, 138, 139, 140, 144, 150, 155, 157, 160, 161, 163, 168, 169, 172, 177, 178, 179, 184, 190, 193, 196, 197, 199, 202, 203, 204, 205, 207, 212, 214, 220, 221, 228, 230, 232, 235, 238, 240, 242, 243, 251;

Direct Yellow 2, 33, 34, 35, 38, 39, 43, 47, 50, 54, 58, 68, 69, 70, 71, 86, 93, 94, 95, 98, 102, 108, 109, 129, 136, 138, 141;

Direct Orange 34, 39, 41, 46, 50, 52, 56, 57, 61, 64, 65, 68, 70, 96, 97, 106, 107;

Direct Red 79, 82, 83, 84, 91, 92, 96, 97, 98, 99, 105, 106, 107, 172, 173, 176, 177, 179, 181, 182, 184, 204, 207, 211, 213, 218, 220, 221, 222, 232, 233, 234, 241, 243, 246, 250;

Direct Violet 47, 52, 54, 59, 60, 65, 66, 79, 80, 81, 82, 84, 89, 90, 93, 95, 96, 103, 104;

Direct Blue 57, 77, 80, 81, 84, 85, 86, 90, 93, 94, 95, 97, 98, 99, 100, 101, 106, 107, 108, 109, 113, 114, 115, 117, 119, 137, 149, 150, 153, 155, 156, 158, 159, 160, 161, 162, 163, 164, 166, 167, 170, 171, 172, 173, 188, 189, 190, 192, 193, 194, 196, 198, 199, 200, 207, 209, 210, 212, 213, 214, 222, 228, 229, 237, 238, 242, 243, 244, 245, 247, 248, 250, 251, 252, 256, 257, 259, 260, 268, 274, 275, 293;

Direct Green 25, 27, 31, 32, 34, 37, 63, 65, 66, 67, 68, 69, 72, 77, 79, 82;

Mordant Yellow 5, 8, 10, 16, 20, 26, 30, 31, 33, 42, 43, 45, 56, 50, 61, 62, 65;

Mordant Orange 3, 4, 5, 8, 12, 13, 14, 20, 21, 23, 24, 28, 29, 32, 34, 35, 36, 37, 42, 43,47,48;

Mordant Red 1, 2, 3, 4, 9, 11, 12, 14, 17, 18, 19, 22, 23, 24, 25, 26, 30, 32, 33, 36, 37, 38, 39, 41, 43, 45, 46, 48, 53, 56, 63, 71, 74, 85, 86, 88, 90, 94, 95;

Mordant Violet 2, 4, 5, 7, 14, 22, 24, 30, 31, 32, 37, 40, 41, 44, 45, 47, 48, 53, 58;

Mordant Blue 2, 3, 7, 8, 9, 12, 13, 15, 16, 19, 20, 21, 22, 23, 24, 26, 30, 31, 32, 39, 40, 41, 43, 44, 48, 49, 53, 61, 74, 77, 83, 84;

Mordant Green 1, 3, 4, 5, 10, 15, 19, 26, 29, 33, 34, 35, 41, 43, 53;

Food Yellow 3;

and derivatives thereof.

Among mentioned above dyes, the following dyes and derivatives thereof are preferably used.

Acid black 24;

Acid blue 23, 25, 29, 62, 80, 86, 87, 92, 138, 158, 182, 243, 324:1;

Acid orange 8, 51, 56, 74, 63, 74;

Acid red 1, 4, 8, 34, 37, 42, 52, 57, 80, 97, 114, 143, 145, 151, 183, 217, 249;

Acid violet 7;

Acid yellow 17, 25, 29, 34, 42, 72, 76, 99, 111, 112, 114, 116, 134, 155, 169, 172, 184, 220, 228, 230, 232, 243;

Acid Green 25.

In addition, azo-, xanthene-, and phthalocyanine-based acidic dyes other than those above are also favorable, and favorable examples thereof include acidic dyes such as C.I. Solvent Blue 44 and 38, C.I. Solvent Orange 45, Rhodamine B, Rhodamine 110, 3-[(5-chloro-2-phenoxyphenyl)hydrazono]-3,4-dihydro-4-oxo-5-[(phenylsulfonyl)amino)-2,7-naphthalenedisulfonic acid, and the derivatives of these dyes.

As for derivatives of acid dyes, an inorganic salt of the acid dye having an acidic group of, for example, a sulfonic acid or a carboxylic acid; a salt of the acid dye with a nitrogen-containing compound; and a sulfonamide of the acid dye and the like can be used. The derivatives are not particularly restricted, so long as they are soluble in a solution of the curable composition. However, the acid dye is selected by taking into consideration all of required properties, such as solubility against an organic solvent or a developer, light absorbance, an interaction with any one of other components in the curable composition, light fastness and heat resistance.

The salt of the acid dye with the nitrogen-containing compound will be described below. Forming a salt between the acid dye and the nitrogen-containing compound may be effective for improving solubility (imparting solubility in an organic solvent) of the acid dye, heat resistance and light fastness.

The nitrogen-containing compound that forms a salt with the acid dye, and the nitrogen-containing compound that forms an amide bond with the acid dye will be described below.

The nitrogen-containing compound is selected taking into consideration all of the required properties such as solubility of the salt or the amide compound in the organic solvent or the developer, salt forming ability, light absorbance and a color value of the dye, an interaction between the nitrogen-containing compound and any one of other components in the curable composition, and heat resistance and light fastness as a coloring agent. A molecular weight of the nitrogen-containing compound is preferably as small as possible when the compound is selected considering only the light absorbance and color value. The molecular weight is preferably 300 or less, more preferably 280 or less and, particularly preferably, 250 or less.

A molar ratio (hereinafter, referred to also as "n") of the nitrogen-containing compound to the acid dye in the salt between the acid dye and nitrogen-containing compound will be described below. The molar ratio n denotes a ratio of an acid dye molecule to an amine compound as a counter ion. The molar ratio n may be freely selected depending on a salt forming condition between the acid dye and the amine compound. Specifically, n is a value satisfying the relation of $0<n\leqq5$ of the number of the functional groups in the acid of the acid dye in most practical cases, and may be selected considering all the required properties such as solubility in the organic solvent or the developer, salt forming ability, light absorbance, an interaction with any one of other components in the curable composition, light fastness and heat resistance.

When n is selected from the viewpoint of only the light absorbance, n preferably satisfies the relation of $0<n\leqq4.5$, more preferably $0<n\leqq4$ and, particularly preferably, $0<n\leqq3.5$.

Since the acid dye is prepared by incorporating an acid group into a structure thereof, it can be changed into a non-acid dye by changing a substituent thereof.

The acid dye may favorably act at the time of an alkali development but may sometimes be over-developed. For this account, when the acid dye is in the risk of being over-developed, the non-acid dye is sometimes favorably used.

<Solvent>

A solvent is contained in the pigment dispersion solution according to the invention (or, in the pigment-containing heat-curable composition according to the invention containing the same). The solvent is preferably selected normally, considering the solubility of the dye and binder and the coating property and stability of the composition, if it satisfies the requirements in the solubility of each component and the coating property of the pigment-containing heat-curable composition. The organic solvents are preferably used as a mixture of two or more.

Preferred examples of the solvent include an ester compound, e.g., ethyl acetate, n-butyl acetate, isobutyl acetate, amyl formate, isoamyl acetate, isobutyl acetate, butyl propionate, isopropyl butyrate, ethyl butyrate, butyl butyrate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate and ethyl ethoxyacetate;

a 3-oxypropionic acid alkyl ester, such as methyl 3-oxypropionate and ethyl 3-oxypropionate, for example, methyl 3-methoxypropionate, ethyl 3-methoxypropionate, methyl 3-ethoxypropionate and ethyl 3-ethoxypropionate, a 2-oxypropionic acid alkyl ester, such as methyl 2-oxypropionate, ethyl 2-oxypropionate and propyl 2-oxypropionate, for example, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate and ethyl 2-ethoxy-2-methylpropionate, methylpyruvate, ethyl pyruvate, propyl pyruvate, methyl acetoacetate, ethyl acetoacetate, methyl 2-oxobutanoate and ethyl 2-oxobutanoate;

an ether compound such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate and propylene glycol monopropyl ether acetate;

a ketone compound, such as methyl ethyl ketone, cyclohexanone, 2-heptanone and 3-heptanone, and an aromatic hydrocarbon compound, such as toluene and xylene.

<Heat-Curable Compound>

The pigment-containing heat-curable composition according to the invention may contain a heat-curable compound. The heat-curable compound for use in the invention is not particularly limited, if it is a compound that hardens by heating, and is, for example, a compound having a heat-curable functional group. Examples of the heat-curable compounds include compounds having at least one group selected from the groups consisting of epoxy, methylol, alkoxymethyl and acyloxymethyl groups.

More preferable examples of the heat-curable compounds include (a) the epoxy resins described above, (b) melamine, guanamine, glycoluril and urea compounds substituted with at least one substituent group selected from methylol, alkoxymethyl and acyloxymethyl groups, and (c) phenol, naphthol and hydroxyanthracene compounds substituted with at least one substituent group selected from methylol, alkoxymethyl and acyloxymethyl groups. Among them, the heat-curable compound is particularly preferably a multifunctional epoxy resin.

The number of a methylol group, an alkoxymethyl group and an acyloxymethyl group contained in and substituted on the compound of the category (b) is generally from 2 to 6 in the case of the melamine compound and from 2 to 4 in the case of the glycoluril compound, the guanamine compound and the urea compound, and is preferably from 5 to 6 in the case of the melamine compound and from 3 to 4 in the case of the glycoluril compound, the guanamine compound and the urea compound.

Hereinafter, such melamine compound, guanamine compound, glycoluryl compound and urea compound as described in (b) may sometimes be referred to also as a methylol group-containing compound of the category (b), an alkoxymethyl group-containing compound of the category (b) or an acyloxymethyl group-containing compound of the category (b).

The methylol group-containing compound of the category (b) can be obtained by heating an alkoxymethyl group-containing compound in an alcohol in the presence of an acid catalyst, such as hydrochloric acid, sulfuric acid, nitric acid and methanesulfonic acid. The acyloxymethyl group-containing compound of the category (b) can be obtained by mixing and stirring a methylol group-containing compound with an acyl chloride in the presence of a basic catalyst.

Specific examples of the compounds of the category (b) having the aforementioned substituent are shown below.

Examples of the melamine compound include hexamethylolmelamine, hexamethoxymethylmelamine, a compound obtained by methoxymethylating from 1 to 5 methylol groups of hexamethylolmelamine or a mixture thereof, hexamethoxyethylmelamine, hexaacyloxymethylmelamine, and a compound obtained by acyloxymethlating from 1 to 5 methylol groups of hexamethylolmelamine or a mixture thereof.

Examples of the guanamine compound include tetramethylolguanamine, tetramethoxymethylguanamine, a compound obtained by methoxymethylating from 1 to 3 methylol groups of tetramethylolguanamine or a mixture thereof, tetramethoxyethylguanamine, tetraacyloxymethylguanamine, and a compound obtained by acyloxymethylating from 1 to 3 methylol groups of tetramethylolguanamine or a mixture thereof.

Examples of the glycoluril compound include tetramethylolglycoluril, tetramethoxymethylglycoluril, a compound obtained by methoxymethylating from 1 to 3 methylol groups of tetramethylolglycoluril or a mixture thereof, and a compound obtained by acyloxymethylating from 1 to 3 methylol groups of tetramethylolglycoluril or a mixture thereof.

Examples of the urea compound include tetramethylolurea, tetramethoxymethylurea, a compound obtained by methoxymethylating from 1 to 3 methylol groups of tetramethylolurea or a mixture thereof, and tetramethoxyethylurea.

The compounds of the category (b) may be used either each individually or in combinations of 2 or more types.

The crosslinking agent (c) above, i.e., the phenol, naphthol, or hydroxyanthracene compound substituted with at least one group selected from methylol, alkoxymethyl, and acyloxymethyl groups, prevents intermixing with the topcoat photoresist and further improves the strength of the film by thermal crosslinking in a similar manner to the crosslinking agent (b) above. Hereinafter, these compounds may be referred to collectively as compounds (c) (methylol group-, alkoxymethyl group- and acyloxymethyl group-containing compounds).

The number of the methylol, acyloxymethyl, and alkoxymethyl groups contained in the compound of the category (c) is at least two per molecule; and compounds having a skeletal phenol compound substituted at all 2- and 4-positions are preferable, from the viewpoints of thermal crosslinking efficiency and storage stability. In addition, the skeletal naphthol or hydroxyanthracene compound is also preferably a compound having substituents at all positions ortho and para to the OH group. The 3- or 5-position of the skeletal phenol compound may be unsubstituted or substituted.

In addition, in the skeletal naphthol compound, the positions excluding those ortho to the OH group may be unsubstituted or substituted.

The methylol group-containing compound of the category (c) may be obtained by using a compound having a hydrogen atom at the 2- or 4-position relative to the phenolic OH group as a starting material and, then, allowing the material to react with formalin in the presence of a base catalyst such as sodium hydroxide, potassium hydroxide, ammonia or tetraalkylammonium hydroxide.

The alkoxymethyl group-containing compound of the category (c) may be obtained by heating the methylol group-containing compound of the category (c) in an alcohol in the presence of an acid catalyst such as hydrochloric acid, sulfuric acid, nitric acid or methane sulfonic acid.

The acyloxymethyl group-containing compound of the category (c) may be obtained by allowing the methylol group-containing compound of the category (c) to react with an acyl chloride in the presence of a base catalyst.

Examples of the skeleton compounds for the compound of the category (c) include phenol, naphthol, and hydroxyanthracene compounds having no substituent on the positions ortho- and para- to the phenolic OH, and the like; and specific examples thereof used include phenol, cresol isomers, 2,3-xylenol, 2,5-xylenol, 3,4-xylenol, 3,5-xylenol, bisphenols such as bisphenol A, 4,4'-bishydroxybiphenyl, Tris P-A (manufactured by Honshu Chemical Industry Co., Ltd.), naphthol, dihydroxynaphthalene, 2,7-dihydroxyanthracene.

As specific examples of the compound of the category (c), examples of the phenol compound include trimethylolphenol, tri(methoxymethyl)phenol, a compound obtained by methoxymethylating from 1 to 2 methylol groups of trimethylolphenol, trimethylol-3-cresol, tri(methoxymethyl)-3-cresol, a compound obtained by methoxymethylating from 1 to 2 methylol groups of trimethylol-3-cresol, a dimethylol-cresol, such as 2,6-dimethylol-4-cresol, tetramethylolbisphenol A, tetramethoxymethylbisphenol A, a compound obtained by methoxymethlating from 1 to 3 methylol groups of tetramethylolbisphenol A, tetramethylol-4,4'-bishydroxybiphenyl, tetramethoxymethyl-4,4'-bishydroxybiphenyl, a hexamethylol compound of Tris P-PA, a hexamethoxymethyl compound of Tris P-PA, a compound obtained by methoxymethylating from 1 to 5 methylol groups of a hexamethylol compound of Tris P-PA, and bishydroxymethylnaphthalenediol.

Examples of the hydroxyanthracene compound include 1,6-dihydroxymethyl-2,7-dihydroxyanthracene, and examples of the acyloxymethyl group-containing compound include compounds obtained by acyloxymethylating a part or all of the methylol groups of the methylol group-containing compounds.

Preferable compounds among the aforementioned compounds are trimethylol phenol, bis hydroxymethyl-p-cresol, tetramethylol bisphenol A, and a hexamethylol form of Tris P-PA (manufactured by Honshu Chemical Industry Co., Ltd.) or a phenol compound in which methylol groups thereof are substituted with alkoxymethyl groups or another phenol compound in which methylol groups thereof are substituted with both methylol groups and alkoxymethyl groups.

The compounds of the category (c) may be used alone or in combinations.

The total content of the heat-curable compounds in the pigment-containing heat-curable composition according to the invention was already described above.

<Various Additives>

The pigment-containing heat-curable composition according to the invention may contain, as needed, various additives such as binder, hardener, curing catalyst, solvent, filler, polymeric compound other than those described above, surfactant, adhesion accelerator, antioxidant, ultraviolet absorbent, aggregation inhibitor, dispersant in the ranges that do not impair the advantageous effects of the invention.

(Hardener)

In the invention, it is preferable to add a hardener when an epoxy resin is used as the heat-curable resin. There are an extremely great number of epoxy resin hardeners that are different in properties such as stability as a mixture of a resin and a hardener, viscosity, hardening temperature, hardening period, and heat generation, and thus, it is necessary to select a suitable hardener according to application, use condition, and work condition of the hardener. Such hardeners are described in detail in Hiroshi Kakiuchi Ed., "Epoxy Resins (Shokodo)", Chapter five. Examples of the hardeners include the followings: catalytic hardeners such as tertiary amines and boron trifluoride-amine complexes; hardeners chemically reacting quantitatively with the functional groups in epoxy resin such as polyamines, acid anhydrides; normal temperature-hardening hardeners such as diethylenetriamine and polyamide resins; medium-temperature hardening hardeners such as diethylaminopropylamine and tris(dimethylaminomethyl)phenol; and high temperature-hardening hardeners such as phthalic anhydride, meta-phenylenediamine; and the like. The hardeners, when seen from the chemical structure, include amines including aliphatic polyamines such as diethylenetriamine, aromatic polyamines such as meta-phenylenediamine, and secondary and tertiary amines such as tris(dimethylaminomethyl)phenol; acid anhydrides including phthalic anhydride, polyamide resins, polysulfide resins, boron trifluoride-monoethylamine complexes, initial-stage condensates, for example, of phenol resins, dicyandiamides, and the like.

These hardeners react, polymerize, and harden with epoxy groups by heating, accompanied with increase in crosslinking density. The content of the binder or the hardener is preferably as small as possible for reduction in film thickness, and in particular, the content of the hardener is preferably 35% by mass or less, more preferably 30% by mass or less, and still more preferably 25% by mass or less, with respect to the heat-curable resin.

(Curing Catalyst)

The pigment-containing heat-curable composition according to the invention may contain a curing catalyst. Examples of the curing catalysts favorable when an epoxy resin is used as the curable resin include imidazole compounds, boron trifluoride complexes (in particular, amine complexes), tertiary amines (guanidines and biguanides), titanate esters, and the like. Among them, imidazole compounds are preferable from the point of hardening rate. In addition, phosphine derivatives may also be used as the curing catalyst. The amount of the curing catalyst added is preferably small at approximately $1/10$ to $1/1000$ times, more preferably approximately $1/20$ to $1/500$ times, and still more preferably approximately $1/30$ to $1/250$ times by weight, with respect to the epoxy resin having an epoxy equivalence of approximately 150 to 200.

Specific examples of the curing catalysts include, but are not limited to, commercially available products such as Imidazole Silane series products: "IS-1000", "IS-1000D", "IM-IOOOJ, "SP-1000", "IA-1000A", "IA-100P" IA-100F", "IA-100AD", "IA-100FD", "IM-100F", "IS-3000", and "IS-4000" manufactured by Japan Energy Corporation; "1B2PZ" and "SFZ" manufactured by Shikoku Chemical Corporation (Dispersant)

In addition, the dispersant above may be added to improve dispersion efficiency of the pigment. Any one of known dispersants may be used as the dispersant as it is properly selected, and examples thereof include cationic surfactants, fluorochemical surfactants, polymer dispersants, and the like.

In addition, the graft copolymers described in JP-A No. 10-254133 containing a monomer having a particular acid amido group or a monomer having a quaternary ammonium salt group as the main chain unit are effective in finely dispersing the pigment, and may be used as the dispersant. By using the graft copolymer above it is possible to disperse the pigment finely while the consumption of energy and time is reduced, prevent aggregation and sedimentation of the dispersed pigment over time, and keep the dispersion stable for an extended period of time.

The dispersants may be used alone or in combination of two or more. The amount of the dispersant added to the pigment-containing heat-curable composition according to the invention is normally, preferably approximately 0.1 to 50 parts by mass, with respect to 100 parts by mass of pigment.

(Other Additives)

Specific examples of the other various additives include, fillers such as glass and alumina; polymeric compounds other than the binder resins such as polyvinylalcohol, polyacrylic acid, polyethylene glycol monoalkylether, and polyfluoroalkyl acrylates; surfactants such as nonionic, cationic, and anionic surfactants; adhesion accelerators such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, and 3-mercaptopropyltrimethoxysilane; antioxidants such as 2,2-thiobis(4-methyl-6-t-butylphenol) and 2,6-di-t-butylphenol; ultraviolet absorbents such as 2-(3-t-butyl-5-methyl-2-hydroxyphenyl)-5-chlorobenzotriazole and alkoxybenzophenones; and aggregation inhibitors such as sodium polyacrylate.

<Method of Preparing Pigment-Containing Heat-Curable Composition>

The method of preparing the pigment-containing heat-curable composition according to the invention favorable in the invention will be described. However, the invention is not limited thereto.

As described above, the pigment-containing heat-curable composition according to the invention characteristically uses a pigment dispersion solution in which a solvent and a pigment are dispersed in the presence of a heat-curable resin. In dispersing the pigment, it is preferable to use pigment particles pulverized into fine particles and having a sharp particle-diameter distribution. Specifically, the pigment preferably has an average particle diameter of approximately 0.01 µm, and contains particles having a particle diameter in the range of 0.01±0.005 µm in an amount of 75% by mass or more.

The method of dispersing the pigment is particularly important, in adjusting the pigment particle-diameter distribution in the range above. An example of the dispersion method is a method in combination of dry dispersion (kneading dispersion) in the high-viscosity state by using a kneader or a roll mill such as two-roll mill and wet dispersion (fine dispersion) in the relatively low-viscosity state by using a three-roll mill, a bead mill, or the like. In the dispersion method, it is also preferable to disperse two or more pigments together or to use no or the minimal amount of solvent during kneading dispersion. It is preferable to add the heat-curable resin component in two portions during the kneading dispersion and during the fine dispersion (two-portion addition) to alleviate the solvent shock, and it is also preferable to use a heat-curable resin component higher in solubility for prevention of the reaggregation of pigment particles when the processing is changed from kneading dispersion to fine dispersion. It is also effective to use high-rigidity ceramic particles or smaller-diameter beads as the medium in the bead mill used during fine dispersion.

In the invention, it is particularly preferable to use two or more pigments in combination, disperse the two or more pigments in a high-viscosity state of 50,000 mPa·s or more and additionally in a low-viscosity state of 1000 mPa·s or less.

Generally, the pigment is supplied after it is dried by various methods after preparation. The pigment is normally supplied as powder after it is separated from an aqueous medium and dried, but drying for powder demands a lot of heat energy, because the latent vaporization heat of water during drying is required greatly. As a result, the pigment is normally present as the aggregate of secondary particles.

In preparing the pigment-containing heat-curable composition according to the invention, a pigment dispersion solution containing a solvent and a pigment dispersed in a heat-curable resin is first prepared.

Specifically, it is preferable to add a heat-curable resin to the pigment and knead and disperse the mixture until it has a relatively high viscosity of 50,000 mPa·s or more (preferably 50,000 to 100,000 mPa·s) after kneading dispersion. The kneading dispersion may be high-viscosity dispersion or dry dispersion.

It is preferable to add a heat-curable resin and other dispersant then as needed to the pigment dispersion solution after kneading dispersion and disperse the mixture finely until it has a relatively low-viscosity of 1,000 mPa·s or less (preferably 100 mPa·s or less) after fine dispersion. The fine dispersion may be low-viscosity dispersion or wet dispersion.

In the kneading dispersion above, the ratio of the solvent to the dispersion is preferably 0 to 20% by mass. It is possible to deposit the components mainly consisting of a vehicle resin component on the pigment particle surface by dispersing the mixture in this manner without use of much solvent, and thus, to convert the pigment particle surface from the solid/gas interface between pigment particle and air to the solid/solution interface between pigment particle and vehicle solution. It is possible to disperse the pigment into the microstate close to the primary particle thereof, by converting the pigment particle surface to an interface from with air to with solution, and agitating the pigment particles.

Thus, it is effective to change the pigment particle surface from the interface with air to that with solution, to disperse the pigment more efficiently. Strong shearing and compressive forces are demanded for the conversion. Thus, it is preferable to use a kneader that applies strong shearing and compressive forces in the kneading dispersion, and also to use high-viscosity pigment particles.

It is also preferable to mix and agitate the mixture together with a fine particulate dispersion medium such as of glass or ceramic in the fine dispersion process. The ratio of the solvent used in the fine dispersion is preferably 20 to 90% by mass with respect to the pigment particles to be dispersed. Because it is necessary to disperse the pigment particles until they are uniformly distributed in the microstate during the fine dispersion, it is preferable to use a dispersing machine that applies strong impact and shearing forces to the aggregated pigment particles and to use low-viscosity pigment particles.

It is possible to prepare the heat-curable compound according to the invention, by adding a curing catalyst or hardener, additionally a heat-curable compound as needed, and further a solvent as needed, to the pigment dispersion solution thus obtained.

<<Image-Recording Material>>

By forming a color layer by using the pigment-containing heat-curable composition according to the invention and laminating a photosensitive resin layer of a photosensitive resin composition, it is possible to use the resulting composite as the image-recording material according to the invention.

<Color Layer>

The color layer may be formed, for example, by applying the pigment-containing heat-curable composition according to the invention containing a solvent, directly or indirectly via another layer, on a substrate by an application method such as rotation coating, slit coating, cast coating, or roll coating.

Specifically, the thickness of the color layer is preferably 0.005 to 0.9 µm, more preferably 0.01 to 0.65 µm, and still more preferably 0.02 to 0.6 µm.

The color layer is preferably formed by forming a coated film by coating the pigment-containing heat-curable composition according to the invention and curing the coated film in a heating process. The heating process may be the same as the drying process after application, or a heat-curing process may be added separately after coating and drying. The heating may be performed by a known heating means such as oven or hot plate, preferably under the condition at 130° C. to 300° C., more preferably 150° C. to 280° C., and particularly preferably 170° C. to 260° C., for a period in the range of preferably 10 second to 3 hours, more preferably 30 seconds to 2 hours, and particularly preferably 60 seconds to 60 minutes. However, the period needed for hardening is preferably as short as possible, considering productivity.

<Photosensitive Resin Layer>

It is possible to form a photosensitive resin layer of a positive- or negative-type photosensitive resin composition on the color layer that is previously formed by using the pigment-containing heat-curable composition according to the invention and hardened by heating as described above.

A positive-type resist composition favorable for positive-type photoresists, which is sensitive to a radiant ray such as ultraviolet ray (g ray or i ray), far-ultraviolet ray such as excimer laser, electron beam, ion beam, or X-ray, may be used as the positive-type photosensitive resin composition. Among the radiation rays, g- and i-rays are preferable for irradiation of the photosensitive resin layer for the object of the invention, and i-ray irradiation is more preferable.

Specifically, the positive-type photosensitive resin composition is preferably a composition containing a quinone diazide compound and an alkali-soluble resin. The positive-type photosensitive resin composition containing a quinone diazide compound and an alkali-soluble resin is used favorable as the positive-type photoresist, because it changes from the alkali insoluble state into the alkali-soluble state by decomposition of the quinone diazide group into carboxyl group by irradiation of a light at a wavelength of 500 nm or less. The positive-type photoresists are significantly superior in resolution and thus, used in production of integrated circuits such as IC and LSI. The quinone diazide compound is for example a naphthoquinone diazide compound.

Recently, the width of the wiring on integrated circuits is becoming finely narrowed, along with the increase in integration density, and thus, conventional wet etching is mostly replaced with dry etching. In the dry etching wherein the shape of the etched layer reflects the shape of the resist, an improper shaped resist results in etching in the region where etching is undesirable and consequently, in defects in the integrated circuit and deterioration in the yield thereof. Thus, there exists an increasing need for a resist that gives a smaller amount of development residue (scum) and is superior in profile more than ever. The dry etching may also cause increase in substrate temperature, thermal deformation of resist pattern, and hence, deterioration in dimensional accuracy. Thus, there is a need for a heat resistant resist more than ever. When the positive-type photoresists commonly used are viewed from the viewpoints above, there are many commercial products that satisfy the requirements in various properties such as profile, scum, resolution and heat resistance; and examples thereof include FH-6000 series products such as "FH-6400L" and "FH-6800L"; FHi-3000 series products such as "FHi-3200" and "FHi-3950"; FHi-690 series products such as "FHi-644" and "FHi-645"; and Fi-SP series products such as "Fi-SP2" manufactured by Fuji film Electronic Materials Co., Ltd., and the like. However, in addition to those above, any positive-type photoresists that have a mask shape suitable for patterning may be used as the positive-type photosensitive resin composition, independently of whether there are commercially available products.

The negative-type photosensitive resin composition is, for example, a negative-type photoresist composition sensitive to a radiant ray such as ultraviolet ray (g ray or i ray), far ultraviolet ray, X ray, electron beam, molecular beam, γ ray, or synchrotron radiation. More specifically, it is preferably a negative-type photoresist composition superior in resolution and sensitivity that does not generate microdefects due to development residue practically. The negative-type photoresist according to the invention is coated on a color layer by spin coating or roller coating to a thickness, for example, of 0.5 to 3 μm. Then, the coated film is heated, dried, exposed via an exposure mask to UV light, forming a circuit pattern or the like, and, additionally as needed, heated after exposure (PEB) and developed, to give a negative image. It is possible to form a pattern on the heat-curable resin layer, additionally by etching the layer by using the image as a mask. Specific application fields thereof include production of semiconductors such as IC, production of circuit boards for liquid crystal devices and thermal heads, and production of other photoapplication products. It is also possible to apply it as a planographic printing plate, by using the difference in ink affinity between the image and the support substrate. There is a need for improvement in the resolution of photoresists, in the trend toward higher integration in production of semiconductor substrates.

The negative-type photosensitive resin layer preferably contains a photopolymerization initiator and a polymerizable compound having an ethylenic unsaturated bond. In regard to the negative-type photosensitive resin composition used in preparation of such a photosensitive resin layer, there are known the following methods. For example, JP-B No. 54-23574 discloses a method of photo-curing a novolak resin in combination with a photo-acid generator of an organic halide. German Patent No. 2057473 describes that a phenol resin such as novolak can be applied as the binder for the photo-curable composition containing a photo-acid generator of diazo compound, a methylolated melamine, and others. JP-A No. 60-263143 discloses a composition consisting of a photo-acid generator, acid-curing aminoblast resin such as melamine resin, and a normal novolak resin that can be developed in an aqueous system and gives a thermally stable negative image. JP-A No. 62-164045 discloses that use of an organic halide absorbing the light in the far-ultraviolet range as the photo-acid generator in such a composition is advantageous. Similarly, JP-A No. 2-52348 discloses that use of an organic halide having a pKa in a particular range as the photo-acid generator in a similar system is advantageous. Further, JP-A No. 2-154266 discloses that use of an oxime-sulfone acid ester as the photo-acid generator in a similar photo-curable composition is advantageous. Alternatively, JP-A No. 2-146044 discloses that a composition in combination of a photo-acid generator containing a particular trichlorotriazine group, an alkoxylated melamine, and a novolak resin containing m-cresol at 30% or more is useful for high-energy ray exposure. Further, EP Patent No. 397460A discloses use of a highly branched novolak resin in a similar composition. Such negative-type photosensitive resin compositions are commercially available, and examples thereof include SC series products such as "SC-60" and "SC-450"; HR series products such as "HR-100" and "HR-200"; and HNR series products such as "HNR-80" and "HNR-120" manufactured by Fuji film Electronic Materials Co., Ltd. However, in addition to those above, any positive-type photoresist that has a mask shape suitable for patterning may be used as the positive-type photosensitive resin composition, independently of whether there are commercially available products.

Specifically, the thickness of the photosensitive resin layer is preferably 0.01 to 3 μm, more preferably 0.1 to 2.5 μm, and still more preferably 0.15 to 2.0 μm, but may be determined arbitrarily according to applications and is not limited thereto.

<Substrate>

The image-recording material according to the invention, normally, has the color layer formed on a substrate. Examples of the substrates include soda-lime glass, Pyrex (registered trademark) glass, quartz glass for use in liquid crystal display devices, and those having an additional transparent conductive film; photoelectric-converting element substrates for use in image sensors and others such as silicon substrate; complimentary metal oxide semiconductors (e.g., CMOS), and the like. Black stripes separating pixels may be formed on the substrate in some cases.

In addition, an undercoat layer may be formed on the substrate as needed, for improvement in adhesiveness to the upper layer, prevention of substance diffusion, or smoothing of the substrate surface.

<<Color Filter and Preparation Thereof>>

The image-recording material according to the invention described above can be used effectively as a color filter material. The production method will be described below. In preparation of the color filter according to the invention, a pattern is formed by dry etching as described above.

In a favorable embodiment of the production method of the color filter according to the invention, an etching mask (pattern image) is formed on the photosensitive resin layer by photolithography, and a pattern is formed on the color layer by dry etching.

First as described above a photosensitive resin layer is exposed via a certain mask pattern to g ray, h ray, i ray, or the like, particularly preferably i ray, and is developed in a developing solution, forming a pattern on the positive- or negative-type photosensitive resin composition. In production of the color filter according to the invention, the composition is dry-etched with a gas such as oxygen, $CF_4$, or $CO_2$, by using the pattern formed as a pattern mask on the photosensitive resin layer. In the process, the color layer is etched according to the pattern of the pattern mask, forming a color pattern.

After etching, the mask resist (photosensitive resin layer after exposure) is removed with a releasing agent or a solvent. Removal of the resist may be performed after completion of all processes. Then, the second and higher color patterns are formed similarly. A full-color pattern may be prepared by subjecting the last color pattern only to thermosetting, removing the excessive pigment-containing heat-curable composition remaining in the upper layer, and surface-smoothing the pattern, for example, by CMP (Chemical mechanical polishing).

The developing solution is not particularly limited, if it does not affect the color layers containing pigment and can dissolve the exposed region of the positive resist and the unhardened region of the negative resist. Specifically, mixtures of various organic solvents and aqueous alkaline solutions are used favorably.

Favorable examples of the aqueous alkaline solutions include aqueous alkaline solutions containing an alkaline compound such as sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, choline, pyrrole, piperidine, or 1,8-diazabicyclo-[5.4,0]-7-undecene at a concentration of 0.001 to 10% by mass, preferably 0.01 to 1% by mass. When an aqueous alkaline solution is used as the developing solution, the color filter is generally washed with water after development.

<Dry Etching>

In preparation of the color filter according to the invention, a pattern is formed by dry etching. Representative examples of the dry etching include methods described by JP-A Nos. 59-126506, 59-46628, 58-9108, 58-2809, 57-148706, and 61-41102 and the like. In these methods, dry etching is performed by patterning the coated resist which is coated after the vapor deposition of a colorant. Examples of the gases used in dry etching include $O_2$, $CF_4$ and the like.

The color filter of the present invention can be used in a liquid crystal display (LCD) or a solid state image pick-up element such as CCD. The color filter is suitable for a high resolution CCD element or CMOS having 1,000,000 or more pixels. The color filter of the present invention may be used by being interposed between light-receiving portions of the pixels constituting the CCD and micro-lenses for converging light.

By the method of producing the color filter according to the invention, it is possible to perform coating uniformly by spin coater or slit coating at an unprecedented high pigment concentration for preparation of a film having a thickness and adhesiveness similar to that formed by vapor deposition, to prepare a thinner film by drastic reduction in the amount of solid contents other than the colorant by the change from photolithography to thermosetting, to form a rectangular disk pattern by dry etching while the anisotropy of the pattern is preserved, and consequently, and to form a film a film having an extremely lower thickness, and superior in pattern squareness and adhesiveness ever than before. Thus, the method of producing the color filter according to the invention is very useful, because it gives a color filter superior in pattern squareness by etching a thin heat-cured film containing a pigment anisotropically with a gas such as oxygen or $CF_4$.

Method of Preparing the Color Filter According to the Second Invention

The method of producing the color filter according to the second invention includes the following processes:

a process (1) of forming a color layer by coating and drying a colorant-containing heat-curable composition containing a colorant and a heat-curable compound and having a colorant concentration of 50% by mass or more and less than 100% by mass with respect to the total solid contents, on a substrate;

a process (2) of heat-curing the color layer formed in process (1);

a process (3) of forming an image-recording material by coating and drying a photosensitive resin composition on the color layer and thus forming the photosensitive resin layer on the heat-cured color layeran image-recording material by coating and drying a photosensitive resin composition on the color layer and thus forming the photosensitive resin layer on the heat-cured color layer formed in the process (2);

a process (4) of forming a pattern formed on the photosensitive resin layer by image wise exposing the photosensitive resin layer formed in process (3) to light and developing the photosensitive resin layer; and a process (5) of a pattern in the color layer by dry-etching the image-recording material having the pattern formed on the photosensitive resin layer formed in process (4).

First, the colorant-containing heat-curable composition used in preparation of the color filter according to the invention will be described.

<Colorant-Containing Heat-Curable Composition>

The colorant-containing heat-curable composition according to the second invention contains a colorant and a heat-curable compound, and has a colorant concentration of 50% by mass or more and less than 100% by mass with respect to the total solid contents. The pigment-containing heat-curable composition described above is favorably used as the colorant-containing heat-curable composition according to the second invention.

<Colorant>

The colorant favorably used in the colorant-containing heat-curable composition according to the second invention can be selected properly from known pigments and dyes.

(Pigment)

Examples of the pigments for use in the colorant-containing heat-curable composition according to the second invention are the same as those for the pigment-containing heat-curable composition according to the invention described above, and the favorable ranges thereof are also the same.

(Dye)

The colorant-containing heat-curable composition used in the method of producing the color filter according to the second invention may contain only a dye or both a pigment and a dye as the colorant. Examples of the dyes for use in the colorant-containing heat-curable composition according to the second invention are the same as those for the pigment-containing heat-curable composition according to the invention described above, and the favorable ranges thereof are also the same.

-Colorant Concentration-

The concentration of the colorant in the colorant-containing heat-curable composition according to the second invention is preferably 50% by mass or more and less than 100% by mass, more preferably 60% by mass or more and 90% by mass or less, and particularly preferably 65% by mass or more and 80% by mass or less, with respect to the total solid contents in the colorant-containing heat-curable composition according to the second invention. A colorant content of less than 50% by mass may result in undesired spectroscopic characteristics and give an image unfavorable in gray balance. A colorant content in the range above is preferable, from the point of its favorable hardening efficiency.

The color filter prepared with the colorant-containing heat-curable composition according to the second invention has spectroscopic characteristics similar to those of the color filter prepared by photolithography and yet gives a thin film.

Normally, it is necessary to increase the concentration of solid contents in the coated film prepared by photolithography, to give a thin film. Alternatively, it is necessary to increase the colorant concentration to obtain desirable spectroscopic characteristics.

Therefore, production of a thin film having desired spectroscopic characteristics by photolithography leads to decrease in the amount of solid contents other than the pigment, consequently causing hardening defects and the disappearance of the pattern associated therewith during alkali development (disappearance in the development or rinsing process). Thus, there was limitation in pigment concentration during production of thin film by photolithography, and it was practically impossible to form a pattern at a pigment concentration of 65% by mass or more.

In contrast, in the method of producing the color filter according to the invention by using the colorant-containing heat-curable composition according to the second invention, it is not necessary to add a monomer (photopolymerizable compound) and a photopolymerization initiator, essential components in the photolithographic method, to the colorant-containing layer, because a colorant-containing coated film (color layer) is hardened and patterned by dry etching in the process (1), as described below. Thus, it is possible to raise the colorant concentration to 50% by mass or more in the colorant-containing heat-curable composition according to the second invention containing at lest a colorant and a heat-curable resin.

The ultimate pigment concentration is 100% by mass by vapor deposition, and the film thickness can be reduced to the lowest by the vapor deposition method, but as described above, there are (1) a problem of apparatus contamination and occasionally (2) a problem in the adhesiveness to the upper or lower layer in vapor deposition.

The method of forming a thin film by coating and curing a heat-curable composition at high pigment concentration by spin coater or slit coating gives a film slightly thicker, to a degree corresponding to the amounts of the heat-curable resin and others added, than that by the vapor deposition method, but eliminates the need for an alkali developing efficiency and thus, allows preparation of a curing solution at a higher pigment concentration that was not possible by the photolithographic method.

With the colorant-containing heat-curable composition according to the second invention, it is possible to obtain the favorable desirable film thickness at a pigment concentration of 50% mass or more in the pigment-containing heat-curable composition according to the invention, but, for example, when a heat-curing system using an epoxy resin described below is used, the pigment concentration may be raised further to 70% by mass or more. That is, it is possible to form a film thinner than the ultimate lowest thickness by the photolithographic method, almost without any change in spectroscopic characteristics.

In addition, it is also possible to obtain an adhesiveness that was not possible by vapor deposition at high pigment concentration, by making the components other than the pigment easily adhesive.

(Heat-Curable Compound)

The heat-curable compound for use in the invention is not particularly limited, if it allows film hardening by heating similarly to the heat-curable compound described above, and is, for example, a compound having a heat-curable functional group. Favorable examples of the heat-curable compounds include compounds having at least one group selected from epoxy, methylol, alkoxymethyl and acyloxymethyl groups.

Still more preferable heat-curable compounds include (a) epoxy resins, (b) melamine, guanamine, glycoluril or urea compounds having at least one substituent group selected from methylol, alkoxymethyl and acyloxymethyl groups, and (c) phenol, naphthol or hydroxyanthracene compounds having at least one substituent selected from methylol, alkoxymethyl and acyloxymethyl groups. Among them, the heat-curable compound is particularly preferably a multifunctional epoxy resin.

The epoxy group-containing resins described above may be used as the epoxy resin (a); those described above may be used as the melamine, guanamine, glycoluril or urea compounds (b) having at least one substituent group selected from methylol, alkoxymethyl and acyloxymethyl groups and the phenol, naphthol or hydroxyanthracene compounds (c) having at least one substituent selected from methylol, alkoxymethyl and acyloxymethyl groups; and the favorable ranges thereof are also the same.

The total content of the heat-curable compounds in the colorant-containing heat-curable composition according to the second invention may vary according to the raw materials used, but preferably 0.1 to 50% by mass, more preferably 0.2 to 40% by mass, and particularly more preferably 1 to 35% by mass, with respect to the total solid contents (by mass) in the heat-curable composition.

<Various Additive>

The colorant-containing heat-curable composition according to the second invention may contain, as needed, various additives such as binder, hardener, curing catalyst, solvent, filler, polymeric compound other than those described above, surfactant, adhesion accelerator, antioxidant, ultraviolet absorbent, aggregation inhibitor, dispersant, and others, in the ranges that do not impair the advantageous effects of the invention, (Binder)

The binder above is often added during preparation of the pigment dispersion solution, and should be soluble in organic solvent but needs not be alkali-soluble.

Examples of the binders are the same as those for the first invention described above, and the favorable ranges thereof are also the same.

The content of the binder in the colorant-containing heat-curable composition according to the second invention is preferably 0.1 to 50% by mass, more preferably, 0.2 to 40% by mass, and particularly preferably 1 to 35% by mass, with respect to the total solid contents (mass) in the composition.

(Hardener)

In the invention, when an epoxy resin is used as the heat-curable resin, it is preferable to add a hardener. Examples of the hardeners are the same as those described for the first invention, and the favorable ranges thereof are also the same.

(Curing Catalyst)

In the second invention, hardening in reaction with the hardener and also hardening in reaction mainly among epoxy groups are effective, to obtain high colorant concentration. It is thus possible to use a curing catalyst instead of a hardener for that purpose. The amount of the curing catalyst added is preferably small at approximately $1/10$ to $1/1000$ times, more preferably approximately $1/20$ to $1/500$ times, and still more preferably approximately $1/30$ to $1/250$ times by weight, with respect to the epoxy resin having an epoxy equivalent of approximately 150 to 200.

Specific examples of the curing catalysts include, but are not limited to, commercially available products such as Imidazole Silane series products: "IS-1000", "IS-1000D", "IM-IOOOJ, "SP-1000", "IA-1000A", "IA-100P" IA-100F", "IA-100AD", "IA-100FD", "IM-100F", "IS-3000", and "IS-4000" manufactured by Japan Energy Corporation; "1B2PZ" and "SFZ" manufactured by Shikoku Chemical Corporation (Solvent)

The colorant-containing heat-curable composition according to the second invention may be used in the form of a solution as it is dissolved in various solvents. Each of the solvents for use in the colorant-containing heat-curable composition according to the second invention is not particularly limited, if it satisfies the requirements in the solubility of each component and the coating efficiency of the colorant-containing heat-curable composition, and the solvents similar to those for the first invention may be used.

In addition, other additives such as dispersant are also the same as those described above in the first invention.

<Method of Preparing Colorant-Containing Heat-Curable Composition>

The method of preparing the colorant-containing heat-curable composition according to the second invention favorable in the invention will be described below. However, the invention is not limited thereto.

As described above, it is favorable to use a pigment having a sharper particle-diameter distribution prepared by pulverizing pigment particles into finer particles, in the colorant-containing heat-curable composition according to the second invention. Specifically, the pigment preferably has an average particle diameter of approximately 0.01 μm, and contains particles having a particle diameter in the range of 0.01±0.005 μm in an amount of 75% by mass or more.

The method of dispersing the pigment is particularly important, in adjusting the pigment particle-diameter distribution in the range above. An example of the dispersion method is a method in combination of dry dispersion (kneading dispersion) in the high-viscosity state by using a kneader or a roll mill such as two-roll mill and wet dispersion (fine dispersion) in the relatively low-viscosity state by using a three-roll mill, a bead mill, or the like. In the dispersion method, it is also preferable to disperse two or more pigment together or to use no or a minimal amount of solvent during kneading dispersion. It is preferable to add the heat-curable resin component in two portions during the kneading dispersion and during the fine dispersion (two-portion addition) to alleviate the solvent shock, and it is also preferable to use a heat-curable resin component higher in solubility, for prevention of the reaggregation of the pigment particles when the processing is changed from kneading dispersion to fine dispersion. It is also effective to use high-rigidity ceramic particles or smaller-diameter beads as the medium in the bead mill used during fine dispersion. Examples of the resin components include the alkali-soluble resins described above.

In the invention, it is preferable to use a colorant prepared by using two or more pigments, and dispersing the two or more pigments into a high-viscosity state of 50,000 mPa·s or more and additionally in a low-viscosity state of 1,000 mPa·s or less.

The pigment is normally supplied after it is dried by various methods after preparation. The pigment is normally supplied as powder after it is separated from an aqueous medium and dried, but drying for powder demands a lot of heat energy, because the latent vaporization heat of water during drying is great. As a result, the pigment is normally present as the aggregate of secondary particles.

When the colorant used in preparation of the colorant-containing heat-curable composition according to the second invention is a pigment, it is preferable to knead and disperse the binder above in the colorant (pigment), to a relatively high-viscosity of 50,000 mPa·s or more (preferably 50,000 to 100,000 mPa·s) after kneading dispersion. The kneading dispersion may be high-viscosity dispersion or dry dispersion.

It is preferable to add a heat-curable resin and other dispersants then as needed to the pigment dispersion solution after kneading dispersion, and disperse the mixture finely until it has a relatively low-viscosity of 1000 mPa·s or less (preferably 100 mPa·s or less) after fine dispersion. The fine dispersion may be low-viscosity dispersion or wet dispersion.

In the kneading dispersion, the ratio of the solvent to the dispersion is preferably 0 to 20% by mass. It is thus possible to deposit the components mainly consisting of a vehicle resin component on the pigment particle surface by dispersing the mixture without use of much solvent, and thus, to convert the pigment particle surface from the solid/gas interface between pigment particle and air to the solid/solution interface between pigment particle and vehicle solution. It is possible to disperse the pigment into the microstate close to the primary particle thereof, by converting the pigment particle surface to an interface from with air to with solution, and agitating the pigment particles.

Thus, it is effective to change the pigment particle surface from the interface with air to that with solution, to disperse the pigment more efficiently. Strong shearing and compressive forces are demanded for the conversion. Thus, it is preferable to use a kneader that applies strong shearing and compressive forces in the kneading dispersion, and also to use high-viscosity pigment particles.

It is also preferable to mix and agitate the mixture together with a fine particulate dispersion medium such as of glass or ceramic in the fine dispersion process. The ratio of the solvent used in the fine dispersion is preferably 20 to 90% by mass with respect to the pigment particles to be dispersed. Because it is necessary to disperse the pigment particles until they are uniformly distributed in the microstate during the fine dispersion, it is preferable to use a dispersing machine that applies strong impact and shearing forces to the aggregated pigment particles and to use low-viscosity pigment particles.

When the colorant is a dye, the dispersion process above is not needed, and the dye may only be dissolved in a suitable solvent.

The heat-curable compound according to the invention can be prepared by adding a heat-curable compound such as epoxy resin, a curing catalyst and a hardener, or a curing catalyst and a hardener as needed, if the binder is a heat-curable compound, to the pigment dispersion solution and the dye solution thus obtained, while the mixture is given with a heat-curing function, and adding a solvent additionally.

<<Image-Recording Material>>

The image-recording material according to the invention used in preparation of the color filter can be used as the image-recording material according to the invention, after a color layer is formed by using the colorant-containing heat-curable composition according to the second invention and additionally a photosensitive resin layer of a photosensitive resin composition is laminated.

Specifically, the image-recording material according to the invention is formed in the processes (1) to (3).

<Color Layer>

The color layer is formed in the process (1) of coating a colorant-containing heat-curable composition containing a colorant and a heat-curable compound and having a colorant concentration of 50% by mass or more and less than 100% by mass with respect to the total solid contents, and forming a color layer by drying the coated composition.

Specifically, it is formed, for example, by applying the colorant-containing heat-curable composition according to the second invention containing a solvent, directly or indirectly via another layer, on a substrate by an application method such as rotation coating, slit coating, cast coating, or roll coating. The thickness of the specific color layer is preferably 0.005 to 0.9 µm, more preferably 0.01 to 0.65 µm, and still more preferably 0.02 to 0.6 µm.

In preparation of the color filter, the color layer according to the invention formed in the process (1) is heat-cured in the process (2). Specifically, the color layer is formed by heat-curing a coated film that is prepared by coating the colorant-containing heat-curable composition according to the second invention on a substrate, in the heating process. The heating process may be the same as the drying process after application, or a heat-curing process may be added separately after coating and drying. The heating may be performed by a known heating means such as oven or hot plate, preferably under the condition at 130° C. to 300° C., more preferably 150° C. to 280° C., and particularly preferably 170° C. to 260° C., for a period in the range of preferably 10 second to 3 hours, more preferably 30 seconds to 2 hours, and particularly preferably 60 seconds to 60 minutes. However, the period needed for hardening is preferably as short as possible, considering productivity.

<Photosensitive Resin Layer>

As described above, the color layer is formed and heat-cured in the processes (1) and (2), and then a photosensitive resin layer is formed on the color layer by the process (3). Specifically, a color layer is formed by using the colorant-containing heat-curable composition according to the second invention and heat-cured by heating, and then, a photosensitive resin layer is formed on the layer by applying and drying a positive- or negative-type photosensitive resin composition thereon.

A positive-type resist composition favorable for the positive-type photoresist that is sensitive to a radiation ray, such ultraviolet ray (g ray or i ray) or far-ultraviolet ray such as excimer laser, electron beam, ion beam, or X ray, may be used as the positive-type photosensitive resin composition. Among the radiation rays, g- and i-rays are preferable for irradiation of the photosensitive resin layer for the object of the invention, and i-ray irradiation is more preferable.

Specifically, the positive-type photosensitive resin composition is preferably a composition containing a quinone diazide compound and an alkali-soluble resin. The positive-type photosensitive resin composition containing a quinone diazide compound and an alkali-soluble resin is used favorable as the positive-type photoresist, because it changes from the alkali insoluble state into the alkali-soluble state by decomposition of the quinone diazide group into carboxyl group by irradiation of a light at a wavelength of 500 nm or less. The positive-type photoresist is significantly superior in resolution and thus, used in production of integrated circuits such as IC and LSI. The quinone diazide compound is for example a naphthoquinone diazide compound.

Recently the width of the wiring on integrated circuits is becoming finely narrowed, along with the increase in integration density, and thus, conventional wet etching is mostly replaced with dry etching. In the dry etching wherein the shape of the etched layer reflects the shape of the resist, an improper shaped resist results in etching in the region where etching is undesirable and consequently, in defects in the integrated circuit and deterioration in the yield thereof. Thus, there exists an increasing need for a resist that gives a smaller amount of development residue (scum) and is superior in profile. The dry etching may also cause increase in substrate temperature, thermal deformation of resist pattern, and hence, deterioration in dimensional accuracy. Thus, there is a need for a heat resistant resist more than ever. When the positive-type photoresists commonly used are viewed from the viewpoints above, there are many commercial products that satisfy the requirements in various properties such as profile, scum, resolution and heat resistance; and examples thereof include FH-6000 series products such as "FH-6400L" and "FH-6800L"; FHi-3000 series products such as "FHi-3200" and "FHi-3950"; FHi-600 series products such as "FHi-644" and "FHi-645"; and Fi-SP series products such as "Fi-SP2" manufactured by Fuji film Electronic Materials Co., Ltd. However, in addition to those above, any positive-type photoresists that have a mask shape suitable for patterning may be used as the positive-type photosensitive resin composition, independently of whether there are commercially available products.

The negative-type photosensitive resin composition is, for example, a negative-type photoresist composition sensitive to a radiant ray such as ultraviolet ray (g ray or i ray), far ultraviolet ray, X ray, electron beam, molecular beam, γ ray, or synchrotron radiation. More specifically, it is preferably a negative-type photoresist composition superior in resolution and sensitivity practically that does not generate microdefects due to development residue. The negative-type photoresist according to the invention is coated on a color layer by spin coating or roller coating to a thickness, for example, of 0.5 to 3 µm. Then, the coated film is heated, dried, exposed via an exposure mask to UV light, printing a circuit pattern or the like, and, additionally as needed, heated after exposure (PEB) and developed, to give a negative image. It is possible to form a pattern on the heat-curable resin layer, additionally by etching the layer by using the image as a mask. Specific application fields thereof include production of semiconductors such as IC, production of circuit boards for liquid crystal devices and thermal heads, and production of other photoapplication products. It is also possible to apply it as a planographic printing plate, by using the difference in ink affinity between the image and the support substrate. There is a need for improvement in the resolution of photoresists, in the trend toward higher integration in production of semiconductor substrates.

The negative-type photosensitive resin layer preferably contains a photopolymerization initiator and a polymerizable compound having an ethylenic unsaturated bond. In regard to the negative-type photosensitive resin composition used in preparation of such a photosensitive resin layer, there are known the following methods. For example, JP-B No. 54-23574 discloses a method of photo-curing a novolak resin in combination with a photo-acid generator of an organic halide. German Patent No. 2057473 describes that a phenol resin such as novolak can be applied as the binder for the photo-curable composition containing a photo-acid generator of diazo compound, a methylolated melamine, and others. JP-A No. 60-263143 discloses a composition consisting of a photo-acid generator, acid-curing aminoblast resin such as melamine resin, and a normal novolak resin that can be developed in an aqueous system and gives a thermally stable negative image. JP-A No. 62-164045 discloses that use of an organic halide absorbing the light in the far-ultraviolet range as the photo-acid generator in such a composition is advantageous. Similarly, JP-A No. 2-52348 discloses that use of an organic halide having a pKa in a particular range as the photo-acid generator in a similar system is advantageous. Further, JP-A No. 2-154266 discloses that use of an oxime-sulfone acid ester as the photo-acid generator in a similar photo-curable composition is advantageous. Alternatively, JP-A No. 2-146044 discloses that a composition in combination of a photo-acid generator containing a particular trichlorotriazine group, an alkoxylated melamine, and a novolak resin containing m-cresol at 30% or more is useful for high-energy ray exposure. Further, EP Patent No. 397460A discloses use of a highly branched novolak resin in a similar composition. Such negative-type photosensitive resin compositions are commercially available, and examples thereof include SC series products such as "SC-60" and "SC-450"; HR series products such as "HR-100" and "HR-200"; and HNR series products such as "HNR-80" and "HNR-120" manufactured by Fuji film Electronic Materials Co., Ltd. However, in addition to those above, any positive-type photoresist that has a mask shape suitable for patterning may be used as the positive-type photosensitive resin composition, independently of whether there are commercially available products.

The thickness of specific photosensitive resin layer is preferably 0.01 to 3 µm, more preferably 0.1 to 2.5 µm, and still more preferably 0.15 to 2 µm.

<Substrate>

A color layer is formed on the substrate of the image-recording material according to the invention. Examples of the substrates include soda-lime glass, Pyrex (registered trademark) glass, and quartz glass for use in liquid crystal display devices and those having an additional transparent conductive film; photoelectric conversion element substrates for use in image sensors and others such as silicon substrate; complimentary metal oxide semiconductors (CMOS), and the like. Black stripes separating pixels are often formed on the substrate.

In addition, an undercoat layer may be formed on the substrate as needed, for improvement in adhesiveness to the upper layer, prevention of substance diffusion, or smoothing of the substrate surface.

<<Color Filter and Production Method Thereof>>

The image-recording material according to the invention described above is used effectively as the color filter material in preparation of the color filter according to the invention. The production method will be described in detail below.

As described above, the method of producing the color filter according to the invention includes the processes (1) to (5) described above.

In production of the color filter according to the invention, an etching mask (pattern image) is formed on the photosensitive resin layer by photolithography, and a pattern is formed on the color layer by dry etching.

As described above, the color layer is formed in the process (1) of coating a colorant-containing heat-curable composition containing a colorant and a heat-curable compound and having a colorant concentration of 50% by mass or more and less than 100% by mass with respect to the total solid contents and forming a color layer by drying the coated composition.

In addition, in production of the color filter preparation of according to the invention, an image-recording material is prepared by heat-curing in the process (2), the color layer formed in the process (1), and a photosensitive resin layer is formed in the process (3) by coating and drying a photosensitive resin composition on the formed color layer.

Then in production of the color filter according to the invention, a patter is formed on the photosensitive resin layer by exposing the photosensitive resin layer formed in process (3) to light in the image shape and developing the layer in the process (4).

The photosensitive resin layer is exposed via a certain (image-shaped) mask pattern, to g ray, h ray, i ray, or the like, particularly preferably i ray, and developed in a developing solution, to form a pattern on a positive- or negative-type photosensitive resin composition. In production of the color filter according to the invention, the photosensitive resin composition is dry-etched with a gas such as oxygen, $CF_4$, or $CO_2$ in the process (5), by using the pattern formed on the photosensitive resin layer formed in the process (4) as a pattern mask. The color layer is etched according to the pattern of the pattern mask in the process (5), giving a color pattern.

After etching, the mask resist (photosensitive resin layer after exposure) is removed with a single-purpose releasing agent or a solvent. Removal of resist may be performed after completion of all processes. The second and higher color patterns are then formed similarly. A full-color pattern may be prepared by subjecting the last color pattern only to thermo-setting, removing the excessive pigment-containing heat-curable composition remaining in the upper layer, and surface-smoothing the pattern, for example, by CMP (Chemical mechanical polishing).

The developing solution is not particularly limited, if it does not affect the color layers containing pigment and can dissolve the exposed region of the positive resist and the unhardened region of the negative resist. Specifically, mixtures of various organic solvents and aqueous alkaline solutions are used favorably.

Preferred examples of the alkali aqueous solution include alkali aqueous solutions obtained by dissolving such an alkali compound to a concentration of 0.001 to 10% by mass, and preferably from 0.01 to 1% by mass, as sodium hydroxide, potassium hydroxide, sodium carbonate, sodium silicate, sodium metasilicate, aqueous ammonia, ethylamine, diethylamine, dimethylmethanolamine, tetramethylammonium hydroxide, tetraethylammonium hydroxide, choline, pyrrole, piperidine and 1,8-diazabicyclo-(5.4.0)-7-undecene. In the case where a developer containing the alkali aqueous solution is used, the layer thus developed is generally washed with water.

<Dry Etching>

In preparation of the color filter according to the invention, a pattern is formed by dry etching. Examples of the gases used in dry etching include $O_2$, $CF_4$ and the like. Representative examples of the dry etching include methods described by JP-A Nos. 59-126506, 59-46628, 58-9108, 58-2809, 57-148706, and 61-41102 and the like. In these methods, dry etching is performed by patterning the coated resist which is coated after the vapor deposition of a colorant.

The color filter of the present invention can be used in a liquid crystal display (LCD) or a solid state image pick-up element such as CCD. The color filter is suitable for a high resolution CCD element or CMOS having 1,000,000 or more pixels. The color filter of the present invention may be used by being interposed between light-receiving portions of the pixels constituting the CCD and micro-lenses for converging light.

In production of the second color filter according to the invention, it is possible to perform coating uniformly by spin coater or slit coating at an unprecedentedly high pigment concentration for preparation of a film having a thickness and adhesiveness similar to that formed by vapor deposition, to prepare a thinner film by drastic reduction in the amount of solid content other than the colorant by the change from photolithography to thermosetting, to form a rectangular disk pattern by dry etching while the anisotropy of the pattern is preserved, and consequently, and to form a film a film having an extremely low thickness and superior in pattern squareness and adhesiveness. Thus, the method of producing the color filter according to the invention is very useful, because it gives a color filter superior in pattern squareness by etching a thin heat-cured film containing a pigment anisotropically with a gas such as oxygen or $CF_4$ and producing a color filter having a significantly high pattern squareness.

EXAMPLES

Hereinafter, the present invention will be described in more detail with reference to Examples, but it should be understood that the invention is not restricted by the following Examples within the technical scope of the invention.

Example 1

<<Preparation of Pigment-containing Heat-curable Composition for Color Filter>>

<Preparation of Pigment Dispersion Solution>

Raw materials respectively shown in the following Table 1 for pigments dispersions in various colors, green (G), blue (B), and red (R), were uniformly blended in a kneader and then, dry-dispersed in a two-roll mill (kneading dispersion).

785 parts by mass of propylene glycol monomethylethyl acetate was then added to each of the dry-dispersed dispersions as a solvent component. The mixture was then agitated in a homogenizer at 2,000 rpm for 30 minutes, to give each of the pigment dispersion solution compositions in various colors green (G), blue (B), and red (R) in which the ingredients are uniformly dispersed. Each dispersion composition obtained was finely dispersed in a bead-dispersing machine (trade name: Dispermat, manufactured by GETZMANN) by using 0.3-mm zirconia beads.

The dispersion was then filtered through a 2.5 μm filter, to give each colors of the pigment dispersion solution (1) to (3) in which the ingredients are uniformly dispersed. The blending (dispersion) viscosity of each pigment dispersion solution during kneading dispersion and fine dispersion, the average particle diameter of the pigment in each pigment dispersion solution, and the rate of the pigments particles having a particle diameter in the range of 0.01±0.005 μm are summarized in Table 1. The particle diameter of pigments was determined by using MICROTRACUPA150 manufactured by Nikkiso Co., Ltd., and using each colored resin composition diluted with propylene glycol monomethylethyl acetate as a sample.

TABLE 1

|  | Pigment dispersion solution (1) green (G) | Pigment dispersion solution (2) blue (B) | Pigment dispersion solution (3) red (R) |
| --- | --- | --- | --- |
| Colorant | Pigment Green (PG) 36 90 parts by mass Pigment Green (PG) 7 25 parts by mass Pigment Yellow (PY) 139 40 parts by mass | Pigment Blue (PB) 15:6 125 parts by mass Pigment Violet (PC) 23 25 parts by mass | Pigment Red (PR) 254 80 parts by mass Pigment Yellow (PY) 139 20 parts by mass |
| Dispersant | PLAAD ED151 (Kusumoto Chemicals, Ltd.) 20 parts by mass | PLAAD ED211 (Amide amine salt of high molecular polycarboxylic acid by Kusumoto Chemicals, Ltd.) 40% by mass | EDAPLAN 472 (Kusumoto Chemicals, Ltd.) 30 parts by mass |
| Resin | Benzyl methacrylate/glycidyl methacrylate copolymer (copolymerization molar ratio 70:30, weight-average molecular weight: 30,000) 20 parts by mass | Benzyl methacrylate/glycidyl methacrylate copolymer (copolymerization molar ratio 70:30, weight-average molecular weight: 30,000) 15 parts by mass | Benzyl methacrylate/glycidyl methacrylate copolymer (copolymerization molar ratio 60:40, weight-average molecular weight: 30,000) 10 parts by mass |
| Solvent | Propylene glycol monomethylethyl acetate 625 parts by mass | Propylene glycol monomethylethyl acetate 785 parts by mass | Propylene glycol monomethylethyl acetate 750 parts by mass |

TABLE 1-continued

|  | Pigment dispersion solution (1) green (G) | Pigment dispersion solution (2) blue (B) | Pigment dispersion solution (3) red (R) |
| --- | --- | --- | --- |
| Viscosity during kneading dispersion | 55,000 mPa · s | 55,000 mPa · s | 70,000 mPa · s |
| Viscosity during fine dispersion | 14 mPa · s | 18 mPa · s | 32 mPa · s |
| Average particle diameter of pigment | 0.015 μm | 0.013 μm | 0.014 μm |
| Rate of pigment particles at 0.01 ± 0.005 μm | 98.2% by mass | 96.0% by mass | 94.4% by mass |

<Preparation of Pigment-containing Heat-curable Composition>

0.4 parts by mass of a curing catalyst (1B2PZ, manufactured by Shikoku Chemical Corporation) was added to the pigment dispersion solution (1), 0.2 parts by mass to the pigment dispersion solution (2), and 0.3 parts by mass to the pigment dispersion solution (3). After confirmation of solubilization, propylene glycol monomethylethyl acetate was added carefully, not to cause pigment shock, to a solid content concentration of 15% by mass in the composition. In this way, pigment-containing heat-curable compositions at high pigment concentration, a pigment dispersion solution (1) at 79.3% by mass, a pigment dispersion solution (2) at 73.0% by mass, and a pigment dispersion solution (3) at 79.8% by mass, were prepared.

<<Patterning>>

Each pigment-containing heat-curable composition thus obtained was coated by a spin coater on a silicon wafer substrate having an undercoat layer of "CT-2000L" manufactured by Fuji film Electronic Materials Co., Ltd. to a thickness of 0.5 μm as coated film, and the coated film was heat-treated on a hot plate at 100° C. for 2 minutes and then dried. The coated film was further heated on the hot plate at 220° C. for 7 minutes, giving a hardened coated film.

Subsequently, "FHi-3950" manufactured by Fuji film Electronic Materials was coated on each of the heat-cured coating samples in various colors as a top layer to a thickness of 1.5 μm by using a spin coater. The coated film was then heat-treated and dried at 100° C. for 2 minutes and pattern-exposed to a light at 200 mJ by using an i-ray stepper.

Then, each of the samples in various colors was developed with "FHD-5" manufactured by Fuji film Electronic Materials for 1 minute, forming a mask of 1.5 μm×1.5 μm in size. The non-masked region in each of these samples was dry-etched with a mixed gas of $CF_4/O_2/Ar$ at a ratio of 2/2/1, forming a pattern. The resist is then separated by using a releasing agent "MS-230" manufactured by Fuji film Electronic Materials, to give a highly square pattern of 1.5 μm square in each color.

Example 2

First, a blue (B) pattern was formed in a similar manner to Example 1. Then, patterns in the second (green (G)) and third (red (R)) colors were formed on the sample in the following manner:

First, the green (G) pigment-containing heat-curable composition of Example 1 was coated on a silicon wafer substrate having a blue (B) pattern previously formed so that the thickness of the green (G) pigment-containing heat-curable composition was 0.5 μm. The substrate was then heated at 100° C. for 2 minutes.

Then, a photoresist "FHi-3950" was coated on the sample after hardening in a similar manner to Example 1; the coated layer was exposed to light by using a pattern that can cover both the blue (B) pattern formed on the substrate and a green (G) pattern having a thickness of 0.5 μm by using an i-ray stepper; and then, the coated layer was developed with "FHD-5" above for 1 minute. At that time, surfaces of the blue (B) pattern formed on the substrate and a layer made of the green (G) pigment-containing heat-curable composition were covered with the photoresist. The portion on the surfaces which was covered with the photoresist would become the blue (B) pattern or the green (G) pattern. The substrate was then dry-etched in a similar manner to Example 1, forming a green (G) pattern. The residual mask resist was removed with a releasing agent similar to that used in Example 1, to form a pattern in the second color.

The red pigment-containing heat-curable composition in the third color was coated additionally on the sample, and heated at 100° C. for 2 minutes and cured at 220° C. for 7 minutes. The sample was then etched with $O_2$ gas, removing the red (R) film on the first- and second-colored patterns, and smoothened, to give a color filter having three colors RGB. The color filter according to the invention was not separated in the processes to form the first to third color layers, and thus, superior in adhesiveness.

Example 3

A color filter in three colors RGB was prepared in a similar manner to Example 2. However, the yellow pigment PY-139 used in the green (G) pigment dispersion solution was replaced with PY-150, and the etching gas used in etching of the green (G) coated film was changed to a gas mixture of $CO/O_2$ at a ratio of 1/1.

Comparative Example 1

<Preparation of Pigment Dispersion Solution>

Pigment dispersion solutions having the compositions shown in the following Table 2 were prepared.

TABLE 2

|  | Pigment dispersion solution (4) green (G) | Pigment dispersion solution (5) blue (B) | Pigment dispersion solution (6) red (R) |
| --- | --- | --- | --- |
| Colorant | Pigment Green (PG) 36 90 parts by mass Pigment Green (PG) 7 | Pigment Blue (PB) 15:6 125 parts by mass Pigment Violet (PC) 23 | Pigment Red (PR) 254 80 parts by mass Pigment Yellow (PY) 139 |

TABLE 2-continued

|  | Pigment dispersion solution (4) green (G) | Pigment dispersion solution (5) blue (B) | Pigment dispersion solution (6) red (R) |
|---|---|---|---|
|  | 25 parts by mass Pigment Yellow (PY) 139 40 parts by mass | 25 parts by mass | 20 parts by mass |
| Dispersant | PLAAD ED151 (Kusumoto Chemicals, Ltd.) 20 parts by mass | PLAAD ED211 (Amide amine salt of high molecular plycarboxylic acid by Kusumoto Chemicals, Ltd.) 40 parts by mass | EDAPLAN 472 (Kusumoto Chemicals, Ltd.) 15 parts by mass |
| Resin | Benzyl methacrylate/glycidyl methacrylate copolymer (copolymerization molar ratio 70:30, weight-average molecular weight: 30,000) 8 parts by mass | Benzyl methacrylate/glycidyl methacrylate copolymer (copolymerization molar ratio 70:30, weight-average molecular weight: 30,000) 6 parts by mass | Benzyl methacrylate/glycidyl methacrylate copolymer (copolymerization molar ratio 60:40, weight-average molecular weight: 30,000) 4 parts by mass |
| Solvent | Propylene glycol monomethylethyl acetate 625 parts by mass | Propylene glycol monomethylethyl acetate 785 parts by mass | Propylene glycol monomethylethyl acetate 500 parts by mass |
| Viscosity during kneading dispersion | 50,000 mPa · s | 50,000 mPa · s | 60 mPa · s |
| Viscosity during fine dispersion | 13 mPa · s | 14.5 mPa · s | 29 mPa · s |
| Average particle diameter of pigment | 0.015 μm | 0.013 μm | 0.014 μm |
| Rate of pigment particles at 0.01 ± 0.005 μm | 97.8% by mass | 97.8% by mass | 96.9% by mass |

<Preparation of Colored Resin Compositions>

The pigment dispersion solutions (4) to (6) obtained above were mixed uniformly respectively with the following components, to give colored resin compositions for color filter in various colors.

1. Green (G) (Pigment Dispersion Solution (4) 808 Parts by Mass)

<Composition>
Dipentaerythritol pentaacrylate (monomer) 10 parts by mass
Propylene glycol monomethylethyl acetate (solvent) 120 parts by mass
Ethyl 3-ethoxypropionate (solvent) 50 parts by mass
Halomethyltriazine initiator 2 parts by mass 2. Blue (B) (Pigment Dispersion Solution (5) 981 Parts by Mass)

<Composition>
Dipentaerythritol pentaacrylate (monomer) 7 parts by mass
Propylene glycol monomethylethyl acetate (solvent) 100 parts by mass
Ethyl 3-ethoxypropionate (solvent) 40 parts by mass
Halomethyltriazine initiator 2 parts by mass 3. Red (R) (Pigment Dispersion Solution (6) 634 Parts by Mass)

<Composition>
Dipentaerythritol pentaacrylate (monomer) 5 parts by mass
Propylene glycol monomethylethyl acetate (solvent) 70 parts by mass
Ethyl 3-ethoxypropionate (solvent) 30 parts by mass
Halomethyl triazine initiator 1 part by mass Similarly, colored resin compositions in various colors having a photolithographic function were prepared at the same concentration as that in Example 1. For preparation of color filters with these colored resin compositions, each of the colored resin compositions was coated by a spin coater on a silicon wafer having an undercoat of "CT-2000L" manufactured by Fuji film Electronic Materials Co., Ltd. to a thickness of 0.5 μm, and the coated film was heated on a hot plate at 100° C. for 2 minutes and dried, in a similar manner to Example 1. The sample was exposed to light by using an i-ray stepper, forming a 1.5 μm pattern, and developed with an alkaline developing solution, "CD-2000" manufactured by Fuji film Electronic Materials Co., Ltd., but all of the samples in various colors were dissolved and disappeared, prohibiting patterning. It is obvious from the results above that patterning by dry etching in the heat-curing mode as in preparation of the color filter according to the invention is most favorable in the high-pigment concentration range as in the invention, and the results confirm that the invention is a method essential for forming a thin film.

<<Evaluation>>

The samples obtained in Examples 1 to 3 and Comparative Example 1 were evaluated in the following tests. Results are summarized in the following Table 3.

<Evaluation Criteria>

1. Squareness

The cross-sectional SEM micrograph of the patterns obtained was analyzed, and a pattern having a rectangular cross section was indicated with "A", and that having a tapered or other deformed cross section with "C".

2. Developing Efficiency

The degrees in the solubilization of colored film before and after mask resist development were observed, and a pattern without solubilization or insufficient development was indicated with "A", while that with solubilization and insufficient development with "C".

3. Surface Condition

The cross-sectional SEM micrograph of the patterns obtained was analyzed, and a pattern having a rectangular cross section was evaluated comparatively; and a pattern having almost no irregularity on the surface and the side wall was indicated with "A"; that with obvious irregularity, with "B"; and that with obvious irregularity and additionally holes and defects, with "C".

4. Adhesiveness

The polishing resistance of the samples was evaluated by CMP (Chemical mechanical polishing). A pattern without separation was indicated with "A"; that with some separation (less than 20%), with "B"; and that with more separation (20% or more), with "C".

TABLE 3

|  | Color | Squareness | Developing efficiency | Surface condition | Adhesiveness |
|---|---|---|---|---|---|
| Example 1 | R | A | A | A | A |
|  | G | A | A | A | A |
|  | B | A | A | A | A |
| Example 2 | R | A | A | A | A |
|  | G | A | A | A | A |
|  | B | A | A | A | A |
| Example 3 | R | A | A | A | A |
|  | G | A | A | A | A |
|  | B | A | A | A | A |
| Comparative example 1 | R | C | C | C | B |
|  | G | C | C | C | B |
|  | B | C | C | C | C |

As apparent from the results in Table 3, the samples obtained in Examples 1 to 3 all gave satisfactory results. The results also show that the method of producing the color filter according to the invention is advantageous.

Example 4

<<Preparation of Colorant-containing Heat-curable Composition for Color Filter>>

<Preparation of Colorant Dispersion Solution>

Raw materials respectively shown in the following Table 4 for pigments dispersions in various colors, green (G), blue (B), and red (R), were uniformly blended in a kneader and then, dry-dispersed in a two-roll mill (kneading dispersion).

785 parts by mass of propylene glycol monomethylethyl acetate was then added to each of the dry-dispersed dispersions as a solvent component. The mixture was then agitated in a homogenizer at 2,000 rpm for 30 minutes, to give each of the colorant dispersion solution compositions in various colors green (G), blue (B), and red (R) in which the ingredients are uniformly dispersed. Each dispersion composition obtained was finely dispersed in a bead-dispersing machine (trade name: Dispermat, manufactured by GETZMANN) by using 0.3-mm zirconia beads.

The dispersion was then filtered through a 2.5 μm filter, to give each of the colorant dispersion solution (1) to (3) in which the ingredients are uniformly dispersed. The blending (dispersion) viscosity of each colorant dispersion solution during kneading dispersion and fine dispersion, the average particle diameter of the pigment in each colorant dispersion solution, and the rate of the pigments particles having a particle diameter in the range of 0.01±0.005 μm are summarized in Table 4. The particle diameter of pigments was determined by using MICROTRACUPA150 manufactured by Nikkiso Co., Ltd., and using each colored resin composition diluted with propylene glycol monomethylethyl acetate as a sample.

TABLE 4

|  | Colorant dispersion solution (1) green (G) | Colorant dispersion solution (2) blue (B) | Colorant dispersion solution (3) red (R) |
|---|---|---|---|
| Colorant | Pigment Green (PG) 36 90 parts by mass Pigment Green (PG) 7 25 parts by mass Pigment Yellow (PY) 139 40 parts by mass | Pigment Blue (PB) 15:6 125 parts by mass Pigment Violet (PV) 23 25 parts by mass | Pigment Red (PR) 254 80 parts by mass Pigment Yellow (PY) 139 20 parts by mass |
| Dispersant | PLAAD ED151 (Kusumoto Chemicals, Ltd.) 20 parts by mass | PLAAD ED211 (polymeric polycarboxylic amide amine salt, manufactured by Kusumoto Chemicals, Ltd.) 40 parts by mass | EDAPLAN 472 (Kusumoto Chemicals, Ltd.) 15 parts by mass |
| Resin | Benzyl methacrylate/glycidyl methacrylate copolymer (copolymerization molar ratio 70:30, weight-average molecular weight: 30,000) 20 parts by mass | Benzyl methacrylate/glycidyl methacrylate copolymer (copolymerization molar ratio 70:30, weight-average molecular weight: 30,000) 15 parts by mass | Benzyl methacrylate/glycidyl methacrylate copolymer (copolymerization molar ratio 70:30, weight-average molecular weight: 30,000) 10 parts by mass |
| Solvent | Propylene glycol monomethylethyl acetate 625 parts by mass | Propylene glycol monomethylethyl acetate 785 parts by mass | Propylene glycol monomethylethyl acetate 750 parts by mass |
| Viscosity during kneading dispersion | 55,000 mPa · s | 55,000 mPa · s | 70,000 mPa · s |
| Viscosity during fine dispersion | 13 mPa · s | 12.5 mPa · s | 15 mPa · s |
| Average particle diameter of pigment | 0.015 μm | 0.013 μm | 0.014 μm |
| Rate of pigment particles at 0.01 ± 0.005 μm | 98.0% by mass | 95.6% by mass | 94.0% by mass |

<Preparation of Colorant-containing Heat-curable Composition>

20 parts by mass of a multifunctional epoxy resin "EHPE-3150" (manufactured by Daicel Chemical Industries, Ltd.) was added to the colorant dispersion solution (1), 6 parts by mass to the colorant dispersion solution (2), and 8 parts by mass to the colorant dispersion solution (3). Further, "1B2PZ" manufactured by Shikoku Chemical Corporation was added to each colorant dispersion solution as a curing catalyst in an amount of 1/50 (by mass) of the epoxy resin. After confirmation of solubilization, propylene glycol monomethylethyl acetate was added carefully, not to cause pigment shock, to a solid content concentration of 15% by mass in the composition. In this way, colorant-containing heat-curable compositions at high pigment concentration, a colorant dispersion solution (1) at 72.0% by mass, a colorant dispersion solution (2) at 71.0% by mass, and a colorant dispersion solution (3) at 75.1% by mass, were prepared.

<Patterning>

Each colorant-containing heat-curable composition thus obtained was coated by a spin coater on a silicon wafer substrate having an undercoat layer of "CT-2000L" manufactured by Fuji film Electronic Materials Co., Ltd. to a thickness of 0.5 μm as coated film, and the coated film was heat-treated on a hot plate at 100° C. for 2 minutes and then dried. The coated film was further heated on the hot plate at 220° C. for 7 minutes, giving a hardened coated film (Process 2).

Subsequently, "FHi-3950" manufactured by Fuji film Electronic Materials was coated on each of the heat-cured coating samples in various colors as a top layer to a thickness of 1.5 μm by using a spin coater. The coated film was then heat-treated and dried at 100° C. for 2 minutes (Process 3) and pattern-exposed to a light at 200 mJ by using an i-ray stepper.

Then, each of the samples in various colors was developed with "FHD-5" manufactured by Fuji film Electronic Materials for 1 minute, forming a mask of 1.5 μm C 1.5 μm in size (Process 4). The non-masked region in each of these samples was dry-etched with a mixed gas of $CF_4/O_2/Ar$ at a ratio of 2/2/1, forming a pattern. The resist is then separated by using a releasing agent "MS-230" manufactured by Fuji film Electronic Materials, to give a highly square pattern of 1.5 μm square in each color (Process 5).

Example 5

First, a blue (B) pattern was formed in a similar manner to Example 4. Then, patterns in the second (green (G)) and third (red (R)) colors were formed on the sample in the following manner:

First, the green (G) pigment-containing heat-curable composition of Example 4 was coated on a silicon wafer substrate having a blue (B) pattern previously formed so that the thickness of the green (G) pigment-containing heat-curable composition was 0.5 μm. The substrate was then heated at 100° C. for 2 minutes.

Then, a photoresist "FHi-3950" was coated on the sample after hardening in a similar manner to Example 4; the coated layer was exposed to light by using a pattern that can cover both the blue (B) pattern formed on the substrate and a green (G) pattern having a thickness of 0.5 μm by using an i-ray stepper; and then, the coated layer was developed with "FHD-5" above for 1 minute. At that time, surfaces of the blue (B) pattern formed on the substrate and a layer made of the green (G) pigment-containing heat-curable composition were covered with the photoresist. The portion on the surfaces which was covered with the photoresist would become the blue (B) pattern or the green (G) pattern. The substrate was then dry-etched in a similar manner to Example 4, forming a green (G) pattern. The residual mask resist was removed with a releasing agent similar to that used in Example 4, to form a pattern in the second color.

The red colorant-containing heat-curable composition in the third color was coated additionally on the sample, and heated at 100° C. for 2 minutes and cured at 220° C. for 7 minutes. The sample was then etched with $O_2$ gas, removing the red (R) film on the first- and second-colored patterns, and smoothened, to give a color filter having three colors RGB. The color filter according to the invention was not separated in the processes to form the first to third color layers, and thus, superior in adhesiveness.

Example 6

A color filter in three colors RGB was prepared in a similar manner to Example 5. However, the yellow pigment PY-139 used in the green (G) colorant dispersion solution was replaced with PY-150, and the etching gas used in etching of the green (G) coated film was changed to a gas mixture of $CO/O_2$ at a ratio of 1/1.

Example 7

A color filter in three RGB colors was prepared in a similar manner to Example 6. However, the colorant-containing heat-curable compositions in various colors of Example 6 were changed to the colorant-containing heat-curable compositions containing a dye shown below.

(Composition of Green (G) Colorant-Containing Heat-Curable Composition)

| | |
|---|---|
| Acid Green 25 | 115 parts by mass |
| Acid Yellow 17 | 40 parts by mass |
| Benzyl methacrylate/copolymer methacrylate (copolymerization molar ratio 70:30, weight-average molecular weight 30,000) | 25 parts by mass |
| Epoxy resin (EHPE-3150, manufactured by Daicel Chemical Industries, Ltd.) | 19.6 parts by mass |
| Curing catalyst (1B2PZ, manufactured by Shikoku Chemical Corporation) | 0.4 part by mass |

(Composition of Blue (B) Colorant-Containing Heat-Curable Composition)

| | |
|---|---|
| Acid Blue 23 | 125 parts by mass |
| Acid Violet 7 | 25 parts by mass |
| Benzyl methacrylate/copolymer methacrylate (copolymerization molar ratio 70:30, weight-average molecular weight 30,000) | 20 parts by mass |
| Epoxy resin (EHPE-3150, manufactured by Daicel Chemical Industries, Ltd.) | 19.6 parts by mass |
| Curing catalyst (IM-1000, manufactured by Japan Energy Corporation) | 0.4 part by mass |

(Composition of Red (R) Colorant-Containing Heat-Curable Composition)

| | |
|---|---|
| Acid Red 8 | 80 parts by mass |
| Acid Yellow 34 | 20 parts by mass |
| Benzyl methacrylate/methacrylic acid copolymer (copolymerization molar ratio 70:30, weight-average molecular weight 30,000) | 10 parts by mass |
| Epoxy resin (Epolead GT401, manufactured by Daicel Chemical Industries, Ltd.) | 5 parts by mass |
| Epoxy resin (EHPE-3150, manufactured by Daicel Chemical Industries, Ltd.) | 9.6 parts by mass |
| Curing catalyst (IM-1000, manufactured by Japan Energy Corporation) | 0.3 part by mass |
| Curing catalyst (1B2PZ, manufactured by Shikoku Chemical Corporation) | 0.1 part by mass |

As described above, it was possible to etch the compositions and prepare a color filter in three RGB colors even when the colorant was changed to a dye.

Comparative Example 3

<Preparation of Colorant Dispersion Solution>

The colorant dispersion solutions having the compositions shown in the following Table 5 were prepared.

Propylene glycol monomethylethyl acetate (solvent) 120 parts by mass
Ethyl 3-ethoxypropionate (solvent) 50 parts by mass
Halomethyl triazine initiator 2 parts by mass 2. Blue (B) (Colorant Dispersion Solution (5) 981 Parts by Mass)

<Composition>
Dipentaerythritol pentaacrylate (monomer) 7 parts by mass
Propylene glycol monomethylethyl acetate (solvent) 100 parts by mass
Ethyl 3-ethoxypropionate (solvent) 40 parts by mass
Halomethyl triazine initiator 2 parts by mass 3. Red (R) (Colorant Dispersion Solution (6) 634 Parts by Mass)

<Composition>
Dipentaerythritol pentaacrylate (monomer) 5 parts by mass
Propylene glycol monomethylethyl acetate (solvent) 70 parts by mass
Ethyl 3-ethoxypropionate (solvent) 30 parts by mass
Halomethyl triazine initiator 1 part by mass Similarly, colored resin compositions in various colors having a photolithographic function were prepared at the

TABLE 5

| | Colorant dispersion solution (4) green (G) | Colorant dispersion solution (5) blue (B) | Colorant dispersion solution (6) red (R) |
|---|---|---|---|
| Colorant | Pigment Green (PG) 36 90 parts by mass Pigment Green (PG) 7 25 parts by mass Pigment Yellow (PY) 139 40 parts by mass | Pigment Blue (PB) 15:6 125 parts by mass Pigment Violet (PC) 23 25 parts by mass | Pigment Red (PR) 254 80 parts by mass Pigment Yellow (PY) 139 20 parts by mass |
| Dispersant | PLAAD ED151 (Kusumoto Chemicals, Ltd.) 20 parts by mass | PLAAD ED211 (Amide amine salt of high molecular plycarboxylic acid by Kusumoto Chemicals, Ltd.) 40 parts % by mass | EDAPLAN 472 (Kusumoto Chemicals, Ltd.) 15 parts by mass |
| Resin | Benzyl methacrylate/glycidyl methacrylate copolymer (copolymerization molar ratio 70:30, weight-average molecular weight: 30,000) 8 parts by mass | Benzyl methacrylate/glycidyl methacrylate copolymer (copolymerization molar ratio 70:30, weight-average molecular weight: 30,000) 6 parts by mass | Benzyl methacrylate/glycidyl methacrylate copolymer (copolymerization molar ratio 60:40, weight-average molecular weight: 30,000) 4 parts by mass |
| Solvent | Propylene glycol monomethylethyl acetate 625 parts by mass | Propylene glycol monomethylethyl acetate 785 parts by mass | Propylene glycol monomethylethyl acetate 500 parts by mass |
| Viscosity during kneading dispersion | 50,000 mPa · s | 50,000 mPa · s | 60 mPa · s |
| Viscosity during fine dispersion | 13 mPa · s | 14.5 mPa · s | 29 mPa · s |
| Average particle diameter of pigment | 0.015 μm | 0.013 μm | 0.014 μm |
| Rate of pigment particles at 0.01 ± 0.005 μm | 97.8% by mass | 97.8% by mass | 96.9% by mass |

<Preparation of Colored Resin Composition>

Colored resin compositions in various colors for color filter were prepared by mixing the colorant dispersion solutions (4) to (6) respectively, uniformly with the following components.

1. Green (G) (Colorant Dispersion Solution (4) 808 Parts by Mass)

<Composition>
Dipentaerythritol pentaacrylate (monomer) 10 parts by mass same concentration as that in Example 4. For preparation of a color filter with these colored resin compositions, each of the colored resin compositions was coated by a spin coater on a silicon wafer having an undercoat of "CT-2000L" manufactured by Fuji film Electronic Materials Co., Ltd. to a thickness of 0.5 μm, and the coated film was heated on a hot plate at 100° C. for 2 minutes and dried, in a similar manner to Example 4. The sample was exposed to light by using an i-ray stepper, forming a 1.5 μm pattern, and developed with an alkaline developing solution, "CD-2000" manufactured by Fuji film Electronic Materials Co., Ltd., but all of the samples in various colors were dissolved and disappeared, prohibiting patterning. It is obvious also from the results above that patterning by dry etching in the heat-curing mode as in preparation of the color filter according to the invention is most favorable in the high-pigment concentration range as in the invention, and the results confirm that the invention is a method essential for forming a thin film.

Comparative Example 4

In a similar manner to Example 7, a curable composition solution having the following composition was coated on a silicon wafer having a undercoat of "CT-2000L" manufactured by Fuji film Electronic Materials Co., Ltd., used as a substrate, by using a spin coater (rotational frequency: 1,450 rpm). After application, the coated film was dried in a clean oven at 80° C. for 10 minutes, forming a curable composition having a thickness of 1.0 µm.

<Curable Composition Solution>

| | |
|---|---|
| Pigment: Mixture of pigment red 177/pigment yellow 83/fatty acid-modified polyester at 3/1/0.2 (mass ratio) | 33.0 parts by mass |
| Alkali-soluble resin: methacrylic acid/polymethyl methacrylate macromonomer/benzyl methacrylate copolymer (mass composition: 30/10/60, weight-average molecular weight: 50,000) | 4.0 parts by mass |
| Heat-curable component | |
| Resin: Epoxy resin (trade name: Epikote 604, manufactured by Sanshin Chemical Industry Co., Ltd.) | 2.0 parts by mass |
| Curing catalyst: following curing catalyst A (trade name: SI-L150, manufactured by Sanshin Chemical Industry Co., Ltd.)) | 0.2 part by mass |
| Solvent: Ethyl 3-ethoxypropionate | 60.8 parts by mass |

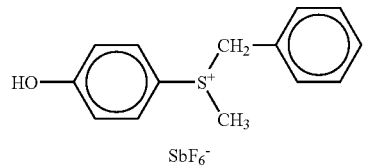

Curing Catalyst A

Then, a negative-type photosensitive composition solution having the following composition was coated on the curable composition layer by using a spin coater (rotational frequency: 1,000 rpm). After application, an image-forming material was prepared by drying the coated film in a clean oven at 80° C. for 10 minutes and forming a negative-type photosensitive composition layer having a thickness of 1.5 µm thereon.

<Negative-type Photosensitive Composition Solution>

| | |
|---|---|
| Alkali-soluble resin: Methacrylic acid/polymethyl methacrylate macromonomer/benzyl methacrylate copolymer (mass composition: 30/10/60, weight-average molecular weight: 50,000) | 25.0 parts by mass |
| Photosensitive component | |
| Monomer: Pentaerythritol tetraacrylate | 20.0 parts by mass |
| Photopolymerization initiator: 1-Hydroxycyclohexylphenylketone (trade name: Irgacure 184, manufactured by Ciba Specialty Chemicals) | 4.5 parts by mass |
| Solvent: Ethyl 3-ethoxypropionate | 49.5 parts by mass |

UV light at a wavelength of 365 nm (I ray) and an intensity of 100 mJ/cm² was irradiated via a photomask (1.5 µm square pattern) to the negative-type photosensitive composition layer thus obtained. Then, the image-recording material was dipped in aqueous 0.1% by mass potassium hydroxide solution for 2 minutes and immersed by ultra-pure water showering for 1 minute; the negative-type photosensitive composition in the radiation ray-unirradiated region and the curable composition below the radiation ray-unirradiated region were removed; and the image-recoding material was dried in air. The curable composition layer was then cured by heating in a clean oven at 200° C. for 60 minutes, to give a red micro pattern having a thickness of 0.5 µm.

The shape of the pattern formed by the method above was compared with that of the pattern formed in Example 1, revealing that the roughness of the shape was larger than that by dry etching and that some of the area to be removed by development remained unremoved and some of the area to be remained was removed. The results also demonstrate the advantage of using the dry etching method, i.e., the method of producing the color filter according to the invention.

<<Evaluation>>

The samples obtained in Examples 4 to 7 and Comparative Examples 3 to 4 were evaluated in the following tests. The squareness, developing efficiency, surface condition, and adhesiveness were evaluated, similarly to Example 1. Results are summarized in the following Table 6.

TABLE 6

| | Color | Squareness | Developing efficiency | Surface condition | Adhesiveness |
|---|---|---|---|---|---|
| Example 4 | R | A | A | A | A |
| | G | A | A | A | A |
| | B | A | A | A | A |
| Example 5 | R | A | A | A | A |
| | G | A | A | A | A |
| | B | A | A | A | A |
| Example 6 | R | A | A | A | A |
| | G | A | A | A | A |
| | B | A | A | A | A |
| Example 7 | R | A | A | A | A |
| | G | A | A | A | A |
| | B | A | A | A | A |
| Comparative example 3 | R | C | C | C | B |
| | G | C | C | C | B |
| | B | C | C | C | C |
| Comparative example 4 | R | C | C | B | B |

As apparent from the results in Table 6, the samples obtained in Examples 4 to 7 gave satisfactory results in all evaluations. The results also indicate the advantage of using the method of preparing the color filter according to the second invention.

As described above, the first invention provides a high-concentration pigment-containing heat-curable composition favorable for etching, superior in spectroscopic characteristics, the sharpness of pattern shape and the adhesiveness between lower and upper layers, allowing reduction in film thickness, and smaller in the total amount of the resins used, and a color filter and an image-recording material using the same. It also provides a method of producing a color filter that gives a superior color filter by a dry etching method higher in performance per cost.

Similarly, the second invention provides a method of producing a color filter that allows production of a color filter superior in spectroscopic characteristics and the sharpness of the pattern shape by using a colorant-containing heat-curable composition favorable for etching, superior in the adhesiveness between lower and upper layers, and allowing reduction in the thickness of film, a color filter prepared by the production method, and a image-recording material for use in production of the color filter.

Favorable embodiments of the invention are as follows:

<1> A pigment-containing heat-curable composition comprising a pigment dispersion solution obtained by dispersing a composition containing a heat-curable resin, a solvent, and a pigment, wherein the concentration of the pigment is 50% or more and less than 100% with respect to the total solid contents.

<2> The pigment-containing heat-curable composition of <1> further comprising a curing catalyst for the heat-curable resin.

<3> The pigment-containing heat-curable composition of <1> wherein the heat-curable resin contains an epoxy group.

<4> A color filter prepared by using the pigment-containing heat-curable composition of <1>.

<5> An image-recording material comprising a color layer prepared by using the pigment-containing heat-curable composition of <1> and a photosensitive resin layer laminated thereon.

<6> A method of producing a color filter by using the image-recording material of <5>, comprising at least:
forming a pattern image on the photosensitive resin layer of the image-recording material;
dry-etching the image-recording material to form a pattern in the color layer of the image-recording material.

<7> A method of producing a color filter, comprising:
forming a color layer by coating and drying a colorant-containing heat-curable composition containing a colorant and a heat-curable compound and having a colorant concentration of 50% by mass or more and less than 100% by mass with respect to the total solid contents, on a substrate;
heat-curing the color layer;
forming an image-recording material by coating and drying a photosensitive resin composition on the color layer and thus forming the photosensitive resin layer on the heat-cured color layer;
forming a pattern formed on the photosensitive resin layer by image wise exposing the photosensitive resin layer to light and developing the photosensitive resin layer; and
forming a pattern in the color layer by dry-etching the image-recording material having the pattern formed on the photosensitive resin layer.

<8> The method of producing a color filter of <7> wherein the colorant-containing heat-curable composition contains the colorant at a concentration of 60% by mass or more and 90% by mass or less with respect to the total solid contents.

<9> The method of producing a color filter of <7> wherein the colorant-containing heat-curable composition contains the colorant at a concentration of 65% by mass or more and 80% by mass or less with respect to the total solid contents.

<10> The method of producing a color filter of <7> wherein the heat-curable compound contains at least one group selected from epoxy, methylol, alkoxymethyl and acyloxymethyl groups as a heat-curable functional group.

<11> The method of producing a color filter of <7> wherein the heat-curable compound is an epoxy resin.

<12> The method of producing a color filter of <11> wherein the epoxy resin is a multifunctional epoxy resin.

<13> The method of producing a color filter of <7> wherein the heat-curable compound is a melamine compound, guanamine compound, glycoluril compound, urea compound, phenol compound, naphthol compound or hydroxyanthracene compound substituted with at least one substituent group selected from methylol, alkoxymethyl and acyloxymethyl groups.

<14> A color filter prepared by the method of producing a color filter of <7>.

<15> An image-recording material for use in the method of producing a color filter of <7> comprising a color layer prepared by using the colorant-containing heat-curable composition and a photosensitive resin layer laminated thereon.

<16> The image-recording material of <15>, wherein the thickness of the color layer is 0.01 to 0.9 m.

<17> The image-recording material of <15>, wherein the photosensitive resin layer is a layer prepared by using a positive-type photosensitive resin composition.

<18> The image-recording material of <15>, wherein the photosensitive resin layer contains an o-naphthoquinone diazide compound.

<19> The image-recording material of <15>, wherein the photosensitive resin layer is a layer prepared by using a negative-type photosensitive resin composition.

<20> The image-recording material of <15>, wherein the photosensitive resin layer contains a photopolymerization initiator and a polymerizable compound having an ethylenic unsaturated bond.

What is claimed is:

1. A method of producing a color filter employing an image-recording material comprising a color layer and a photosensitive resin layer laminated thereon, said method comprising at least:
   forming a pattern image on the photosensitive resin layer of the image-recording material;
   dry-etching the image-recording material to form a pattern in the color layer of the image-recording material;
   wherein said color layer is formed by a pigment-containing heat-curable composition comprising a pigment dispersion solution obtained by dispersing a composition containing a heat-curable resin, a solvent, and a pigment, wherein the concentration of the pigment is 50% or more and less than 100% with respect to the total solid contents.

2. A method of producing a color filter, comprising:
   forming a color layer by coating and drying a colorant-containing heat-curable composition containing a colorant and a heat-curable compound and having a colorant concentration of 50% by mass or more and less than 100% by mass with respect to the total solid contents, on a substrate;
   heat-curing the color layer;
   forming an image-recording material by coating and drying a photosensitive resin composition on the color layer and thus forming the photosensitive resin layer on the heat-cured color layer;
   forming a pattern formed on the photosensitive resin layer by image wise exposing the photosensitive resin layer to light and developing the photosensitive resin layer; and
   forming a pattern in the color layer by dry-etching the image-recording material having the pattern formed on the photosensitive resin layer.

3. The method of producing a color filter of claim 2, wherein the colorant-containing heat-curable composition contains the colorant at a concentration of 60% by mass or more and 90% by mass or less with respect to the total solid contents.

4. The method of producing a color filter of claim 2, wherein the colorant-containing heat-curable composition contains the colorant at a concentration of 65% by mass or more and 80% by mass or less with respect to the total solid contents.

5. The method of producing a color filter of claim 2, wherein the heat-curable compound contains at least one group selected from epoxy, methylol, alkoxymethyl and acyloxymethyl groups as a heat-curable functional group.

6. The method of producing a color filter of claim 2, wherein the heat-curable compound is an epoxy resin.

7. The method of producing a color filter of claim 6, wherein the epoxy resin is a multifunctional epoxy resin.

8. The method of producing a color filter of claim 2, wherein the heat-curable compound is a melamine compound, guanamine compound, glycoluril compound, urea compound, phenol compound, naphthol compound or hydroxyanthracene compound substituted with at least one substituent group selected from methylol, alkoxymethyl and acyloxymethyl groups.

* * * * *